US010390034B2

(12) United States Patent
Zhu et al.

(10) Patent No.: US 10,390,034 B2
(45) Date of Patent: Aug. 20, 2019

(54) INNOVATIONS IN BLOCK VECTOR PREDICTION AND ESTIMATION OF RECONSTRUCTED SAMPLE VALUES WITHIN AN OVERLAP AREA

(71) Applicant: Microsoft Corporation, Redmond, WA (US)

(72) Inventors: Lihua Zhu, Mountain View, CA (US); Gary J. Sullivan, Bellevue, WA (US); Yongjun Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 448 days.

(21) Appl. No.: 14/222,580

(22) Filed: Mar. 21, 2014

(65) Prior Publication Data

US 2015/0195526 A1    Jul. 9, 2015

Related U.S. Application Data

(60) Provisional application No. 61/923,628, filed on Jan. 3, 2014.

(51) Int. Cl.
*H04N 19/51*    (2014.01)
*H04N 19/52*    (2014.01)
(Continued)

(52) U.S. Cl.
CPC .......... *H04N 19/51* (2014.11); *H04N 19/105* (2014.11); *H04N 19/167* (2014.11);
(Continued)

(58) Field of Classification Search
USPC .................................................. 375/240.14
See application file for complete search history.

(56) References Cited

U.S. PATENT DOCUMENTS 5,049,986 A   9/1991  Aono et al.
5,706,290 A   1/1998  Shaw et al.
(Continued)

FOREIGN PATENT DOCUMENTS

AU    2013228045    4/2015
CN    1874519       12/2006
(Continued)

OTHER PUBLICATIONS

Kenichi Iwata et al.( K. Iwata, R. Hashimoto, S. Mochizuki and K. Aizawa, "Intra texture prediction based on repetitive pixel replenishment," 2012 19th IEEE International Conference on Image Processing, Orlando, FL, Sep. 30, 2012(Sep. 30, 2012), pp. 2933-2936(4 pages)).*

(Continued)

*Primary Examiner* — Behrooz M Senfi
*Assistant Examiner* — Ana Picon-Feliciano
(74) *Attorney, Agent, or Firm* — Klarquist Sparkman, LLP

(57) ABSTRACT

Innovations in encoder-side options for intra block copy ("BC") prediction mode facilitate intra BC prediction that is more effective in terms of rate-distortion performance and/or computational efficiency of encoding. For example, some of the innovations relate to estimation of sample values within an overlap area of a current block during block vector estimation. Other innovations relate to prediction of block vector ("BV") values during encoding or decoding using "ping-pong" approaches.

20 Claims, 17 Drawing Sheets

(51) Int. Cl.
*H04N 19/105* (2014.01)
*H04N 19/167* (2014.01)
*H04N 19/176* (2014.01)
*H04N 19/583* (2014.01)
*H04N 19/593* (2014.01)

(52) U.S. Cl.
CPC .......... *H04N 19/176* (2014.11); *H04N 19/52* (2014.11); *H04N 19/583* (2014.11); *H04N 19/593* (2014.11)

(56) References Cited

U.S. PATENT DOCUMENTS

| | | |
|---|---|---|
| 6,701,012 B1 | 3/2004 | Matthews |
| 6,748,116 B1 | 6/2004 | Yue et al. |
| 7,023,924 B1 | 4/2006 | Keller et al. |
| 7,289,674 B2 | 10/2007 | Karczewicz |
| 7,317,839 B2 | 1/2008 | Holcomb |
| 7,352,905 B2 | 4/2008 | Mukerjee et al. |
| 7,403,136 B2 | 7/2008 | De La Cruz et al. |
| 7,848,426 B2 | 12/2010 | Lee et al. |
| 7,903,873 B2 | 3/2011 | Ding et al. |
| 7,978,770 B2 | 7/2011 | Luo et al. |
| 8,036,271 B2 | 10/2011 | Winger et al. |
| 8,085,845 B2 | 12/2011 | Tourapis et al. |
| 8,116,374 B2 | 2/2012 | Gordon et al. |
| 8,213,503 B2 | 7/2012 | Tu et al. |
| 8,218,641 B2 | 7/2012 | Wang |
| 8,300,963 B2 | 10/2012 | Ohk et al. |
| 8,457,200 B2 | 6/2013 | Andersson et al. |
| 8,493,513 B2 | 7/2013 | Sullivan et al. |
| 8,509,553 B2 | 8/2013 | Ding et al. |
| 8,548,057 B2 | 10/2013 | Li et al. |
| 8,619,857 B2 | 12/2013 | Zhao et al. |
| 8,644,375 B2 | 2/2014 | Segall et al. |
| 8,693,547 B2 | 4/2014 | Bankoski et al. |
| 8,711,945 B2 | 4/2014 | Henocq et al. |
| 8,737,824 B1 | 5/2014 | Bultje |
| 8,861,848 B2 | 10/2014 | Sato |
| 9,252,806 B2 | 2/2016 | Marpe et al. |
| 9,264,713 B2 * | 2/2016 | Joshi ................ H04N 19/176 |
| 9,288,501 B2 | 3/2016 | Zheng et al. |
| 9,591,325 B2 | 3/2017 | Li et al. |
| 9,699,468 B2 | 7/2017 | Guo et al. |
| 9,762,903 B2 | 9/2017 | Chen et al. |
| 2001/0036314 A1 | 11/2001 | Yamaguchi et al. |
| 2001/0053248 A1 | 12/2001 | Maeda et al. |
| 2002/0168105 A1 | 11/2002 | Li et al. |
| 2003/0048944 A1 | 3/2003 | De et al. |
| 2003/0202588 A1 | 10/2003 | Yu et al. |
| 2003/0215014 A1 | 11/2003 | Koto et al. |
| 2004/0062312 A1 | 4/2004 | Heuer et al. |
| 2004/0202374 A1 | 10/2004 | Venkataraman |
| 2005/0013365 A1 | 1/2005 | Mukerjee et al. |
| 2005/0185713 A1 | 8/2005 | Winger et al. |
| 2005/0249283 A1 | 11/2005 | Kajiwara et al. |
| 2006/0051068 A1 | 3/2006 | Gomila |
| 2006/0104527 A1 | 5/2006 | Koto et al. |
| 2006/0274070 A1 | 12/2006 | Herman et al. |
| 2006/0274956 A1 | 12/2006 | Sohn et al. |
| 2006/0282855 A1 | 12/2006 | Margulis et al. |
| 2007/0036226 A1 | 2/2007 | Kim et al. |
| 2007/0116110 A1 | 5/2007 | Diamant et al. |
| 2007/0116370 A1 | 5/2007 | Smirnov |
| 2007/0201751 A1 | 8/2007 | Wu et al. |
| 2008/0021879 A1 | 1/2008 | Cheng |
| 2008/0037624 A1 * | 2/2008 | Walker ................ H04N 19/196 375/240.01 |
| 2008/0063080 A1 | 3/2008 | Madumbu et al. |
| 2008/0084924 A1 | 4/2008 | Monro et al. |
| 2008/0253457 A1 | 10/2008 | Moore |
| 2008/0317132 A1 | 12/2008 | Zhou et al. |
| 2009/0074307 A1 | 3/2009 | Lu et al. |
| 2009/0195690 A1 | 8/2009 | Wang |
| 2010/0061461 A1 | 3/2010 | Bankoski et al. |
| 2010/0111410 A1 | 5/2010 | Lu et al. |
| 2010/0158400 A1 | 6/2010 | Lu et al. |
| 2011/0142132 A1 | 6/2011 | Tourapis et al. |
| 2011/0194608 A1 | 8/2011 | Rusert et al. |
| 2011/0194613 A1 | 8/2011 | Chen et al. |
| 2011/0243229 A1 | 10/2011 | Kim et al. |
| 2011/0255591 A1 | 10/2011 | Kim et al. |
| 2012/0163451 A1 | 6/2012 | Cohen et al. |
| 2012/0163457 A1 | 6/2012 | Wahadaniah et al. |
| 2012/0177118 A1 | 7/2012 | Karczewicz et al. |
| 2012/0189051 A1 | 7/2012 | Zheng et al. |
| 2012/0189055 A1 | 7/2012 | Chien et al. |
| 2012/0195368 A1 | 8/2012 | Chien et al. |
| 2012/0213288 A1 | 8/2012 | Kitaura et al. |
| 2012/0236942 A1 | 9/2012 | Lin et al. |
| 2012/0250764 A1 | 10/2012 | Martin et al. |
| 2012/0281760 A1 | 11/2012 | Kim |
| 2012/0281769 A1 | 11/2012 | Yang et al. |
| 2012/0294353 A1 | 11/2012 | Fu et al. |
| 2012/0300840 A1 | 11/2012 | Motoharu |
| 2012/0320975 A1 | 12/2012 | Kim et al. |
| 2012/0328209 A1 | 12/2012 | Sasai et al. |
| 2013/0003827 A1 | 1/2013 | Misra et al. |
| 2013/0016777 A1 | 1/2013 | Gao et al. |
| 2013/0034163 A1 | 2/2013 | Amonou et al. |
| 2013/0050254 A1 | 2/2013 | Tran et al. |
| 2013/0051452 A1 | 2/2013 | Li et al. |
| 2013/0089266 A1 | 4/2013 | Yang et al. |
| 2013/0101040 A1 | 4/2013 | Francois et al. |
| 2013/0108182 A1 | 5/2013 | Yie et al. |
| 2013/0114675 A1 | 5/2013 | Guo et al. |
| 2013/0114677 A1 | 5/2013 | Baylon et al. |
| 2013/0114713 A1 | 5/2013 | Bossen et al. |
| 2013/0114720 A1 | 5/2013 | Wang et al. |
| 2013/0114730 A1 | 5/2013 | Joshi et al. |
| 2013/0121417 A1 | 5/2013 | Chong et al. |
| 2013/0128974 A1 | 5/2013 | Chien et al. |
| 2013/0128982 A1 | 5/2013 | Kim et al. |
| 2013/0163664 A1 | 6/2013 | Guo et al. |
| 2013/0163668 A1 | 6/2013 | Chen et al. |
| 2013/0170550 A1 | 7/2013 | Li et al. |
| 2013/0182755 A1 | 7/2013 | Chen et al. |
| 2013/0182764 A1 | 7/2013 | Narroschke et al. |
| 2013/0188695 A1 | 7/2013 | Maani et al. |
| 2013/0188719 A1 | 7/2013 | Chen et al. |
| 2013/0188867 A1 | 7/2013 | Sato |
| 2013/0202051 A1 | 8/2013 | Zhou |
| 2013/0215970 A1 | 8/2013 | Fang et al. |
| 2013/0243093 A1 | 9/2013 | Chen et al. |
| 2013/0258052 A1 | 10/2013 | Li et al. |
| 2013/0259128 A1 | 10/2013 | Song et al. |
| 2013/0272370 A1 | 10/2013 | Coban et al. |
| 2013/0272404 A1 | 10/2013 | Park et al. |
| 2013/0272409 A1 | 10/2013 | Seregin et al. |
| 2013/0279577 A1 | 10/2013 | Schwarz et al. |
| 2013/0287103 A1 | 10/2013 | Seregin et al. |
| 2013/0287105 A1 | 10/2013 | Hashimoto et al. |
| 2014/0002599 A1 | 1/2014 | Lee et al. |
| 2014/0003493 A1 | 1/2014 | Chen et al. |
| 2014/0003531 A1 | 1/2014 | Coban et al. |
| 2014/0016698 A1 | 1/2014 | Joshi et al. |
| 2014/0023144 A1 | 1/2014 | Park et al. |
| 2014/0029668 A1 | 1/2014 | Lim et al. |
| 2014/0064360 A1 | 3/2014 | Rapaka et al. |
| 2014/0071235 A1 | 3/2014 | Zhang et al. |
| 2014/0085418 A1 | 3/2014 | Takahashi et al. |
| 2014/0086502 A1 | 3/2014 | Guo et al. |
| 2014/0140404 A1 | 5/2014 | Liu et al. |
| 2014/0184740 A1 | 7/2014 | Zhang et al. |
| 2014/0192883 A1 | 7/2014 | Seregin et al. |
| 2014/0226721 A1 | 8/2014 | Joshi et al. |
| 2014/0253681 A1 | 9/2014 | Zhang et al. |
| 2014/0294061 A1 | 10/2014 | Zhang et al. |
| 2014/0301465 A1 | 10/2014 | Kwon et al. |
| 2014/0355667 A1 | 12/2014 | Lei et al. |
| 2014/0362917 A1 | 12/2014 | Joshi et al. |
| 2014/0376619 A1 | 12/2014 | Tourapis |
| 2014/0376634 A1 | 12/2014 | Guo et al. |
| 2015/0016501 A1 | 1/2015 | Guo et al. |

(56) References Cited

U.S. PATENT DOCUMENTS

| | | | |
|---|---|---|---|
| 2015/0016516 A1 | 1/2015 | Saxena et al. | |
| 2015/0063440 A1 | 3/2015 | Pang et al. | |
| 2015/0071357 A1* | 3/2015 | Pang | H04N 19/563 375/240.16 |
| 2015/0110181 A1 | 4/2015 | Saxena et al. | |
| 2015/0146976 A1 | 5/2015 | Ma et al. | |
| 2015/0189272 A1 | 7/2015 | Peng et al. | |
| 2015/0195526 A1 | 7/2015 | Zhu et al. | |
| 2015/0195559 A1 | 7/2015 | Chen et al. | |
| 2015/0208084 A1 | 7/2015 | Zhu et al. | |
| 2015/0229933 A1 | 8/2015 | Guo et al. | |
| 2015/0270850 A1 | 9/2015 | Marpe et al. | |
| 2015/0271515 A1 | 9/2015 | Chao et al. | |
| 2015/0373366 A1 | 12/2015 | He et al. | |
| 2016/0165263 A1 | 6/2016 | Zhang et al. | |
| 2016/0219298 A1 | 7/2016 | Li et al. | |
| 2016/0227244 A1 | 8/2016 | Rosewarne | |
| 2016/0241858 A1 | 8/2016 | Li et al. | |
| 2016/0241868 A1 | 8/2016 | Li et al. | |
| 2016/0277733 A1 | 9/2016 | Li et al. | |
| 2016/0277760 A1 | 9/2016 | Li et al. | |
| 2016/0330471 A1 | 11/2016 | Zhu et al. | |
| 2017/0064330 A1 | 3/2017 | Li et al. | |
| 2017/0070748 A1 | 3/2017 | Li et al. | |
| 2017/0142418 A1 | 5/2017 | Li et al. | |
| 2017/0238001 A1 | 8/2017 | Li et al. | |
| 2017/0302939 A1 | 10/2017 | Guo et al. | |

FOREIGN PATENT DOCUMENTS

| | | |
|---|---|---|
| CN | 101009835 | 8/2007 |
| CN | 101026761 | 8/2007 |
| CN | 101115205 | 1/2008 |
| CN | 101207819 | 6/2008 |
| CN | 101232619 | 7/2008 |
| CN | 101420606 | 4/2009 |
| CN | 101422047 | 4/2009 |
| CN | 101507279 | 8/2009 |
| CN | 101626512 | 1/2010 |
| CN | 101816177 | 8/2010 |
| CN | 102077594 | 5/2011 |
| CN | 102077597 | 5/2011 |
| CN | 102090062 | 6/2011 |
| CN | 102137263 | 7/2011 |
| CN | 102223541 | 10/2011 |
| CN | 102752595 | 10/2012 |
| CN | 102835113 | 12/2012 |
| CN | 103155563 | 6/2013 |
| CN | 103220512 | 7/2013 |
| CN | 103237226 | 8/2013 |
| CN | 103238332 | 8/2013 |
| CN | 103281538 | 9/2013 |
| CN | 103283238 | 9/2013 |
| CN | 103385003 | 11/2013 |
| CN | 103392340 | 11/2013 |
| CN | 103430540 | 12/2013 |
| CN | 104221381 | 12/2014 |
| CN | 104244007 | 12/2014 |
| CN | 104378644 | 2/2015 |
| EP | 2249571 | 11/2010 |
| EP | 2664070 | 11/2013 |
| EP | 2924996 | 9/2015 |
| EP | 3085083 | 10/2016 |
| EP | 3146717 | 3/2017 |
| GB | 2114404 | 8/1983 |
| GB | 2495990 | 5/2013 |
| JP | 2000-102016 | 4/2000 |
| JP | 2002-094805 | 3/2002 |
| JP | 2006-140683 | 6/2006 |
| JP | 2007-053561 | 3/2007 |
| JP | 2009-147807 | 7/2009 |
| JP | 2009-525705 | 7/2009 |
| JP | 2009-260473 | 11/2009 |
| JP | 2011-517230 | 5/2011 |
| JP | 2011-114572 | 6/2011 |
| JP | 2012-257148 | 12/2012 |
| JP | 2015-516759 | 6/2015 |
| KR | 20150003239 | 1/2015 |
| RU | 2314656 | 1/2008 |
| RU | 2335859 | 10/2008 |
| RU | 2367113 | 9/2009 |
| RU | 2407223 | 12/2010 |
| RU | 2472305 | 2/2011 |
| RU | 2420021 | 5/2011 |
| RU | 2493670 | 9/2013 |
| WO | WO 2004/064396 | 7/2004 |
| WO | WO 2007/119198 | 10/2007 |
| WO | WO 2008/036112 | 3/2008 |
| WO | WO 2010/085899 | 8/2010 |
| WO | WO 2011/048903 | 4/2011 |
| WO | WO 2012/128540 | 9/2012 |
| WO | WO 2012/146320 | 11/2012 |
| WO | WO 2012/159306 | 11/2012 |
| WO | WO 2012/174990 | 12/2012 |
| WO | WO 2013/009896 | 1/2013 |
| WO | WO 2013/057359 | 4/2013 |
| WO | WO 2013/068564 | 5/2013 |
| WO | WO 2013/072484 | 5/2013 |
| WO | WO 2013/076978 | 5/2013 |
| WO | WO 2013/107906 | 7/2013 |
| WO | WO 2013/108922 | 7/2013 |
| WO | WO 2013/128010 | 9/2013 |
| WO | WO 2013/148002 | 10/2013 |
| WO | WO 2013/154687 | 10/2013 |
| WO | WO 2013/159643 | 10/2013 |
| WO | WO2013/160696 | 10/2013 |
| WO | WO 2014/053099 | 4/2014 |
| WO | WO 2014/166104 | 10/2014 |
| WO | WO 2015/004441 | 1/2015 |
| WO | WO 2015/035449 | 3/2015 |
| WO | WO 2015/114322 | 8/2015 |

OTHER PUBLICATIONS

Pang et al.( Pang C et al, "AhG5: Intra block copying with padding", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/, (Oct. 26, 2013), No. JCTVC-O0157-v5, XP030115179, 6 pp.).*

Sole et al.(Sole et al., "HEVC Range Extensions Core Experiment 3 (RCE3): Intra block copy refinement," JCTVC-O1123, 6 pp. ,Oct. 23, 2013-Nov. 1, 2013).*

K. K Iwata, R. Hashimoto, S. Mochizuki and K. Aizawa, "Intra texture prediction based on repetitive pixel replenishment," 2012 19th IEEE International Conference on Image Processing, Orlando, FL, Sep. 30, 2012(Sep. 30, 2012), pp. 2933-2936(4 pages).*

Pang C et al, "AhG5: Intra block copying with padding", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, (Oct. 26, 2013), No. JCTVC-O0157-v5, XP030115179, 6 pp.*

Sole et al., "HEVC Range Extensions Core Experiment 3 (RCE3): Intra block copy refinement," JCTVC-O1123, 6 pp. ,Oct. 23, 2013-Nov. 1, 2013.*

Lee et al.(Lee et al.,"AHG5:Extension of intra block copy", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-O0112, 9 pp.) (Year: 2013).*

Budagavi et al., "AHG8: Video coding using Intra motion compensation," JCTVC-M0350, 3 pp. (Apr. 2013).

Flynn et al., "BoG report on Range Extensions topics," JCTVC-O0352, 48 pp. (Oct. 2013).

Fonseca, et al., "Open-Loop Prediction in H.264/AVC for High Definition Sequences," 4 pp. (document marked Sep. 3, 2007).

International Search Report and Written Opinion dated Jun. 29, 2015, from International Patent Application No. PCT/US2014/071780, 24 pp.

(56) References Cited

OTHER PUBLICATIONS

Iwata et al., "Intra Texture Prediction Based on Repetitive Pixel Replenishment," *IEEE Int'l Conf. on Image Processing*, pp. 2933-2936 (Sep. 2012).
Li et al., "On Intra BC mode," JCTVC-O0183, 12 pp. (Oct. 2013).
Pang et al., "AhG5: Intra block copying with padding," JCTVC-O0157, 6 pp. (Oct. 2013).
Pang et al., "Non-RCE3: Intra Motion Compensation with 2-D MVs," JCTVC-N0256, 12 pp. (Jul. 2013).
Sole et al., "HEVC Range Extensions Core Experiment 3 (RCE3): Intra block copy refinement," JCTVC-O1123, 6 pp. (Oct. 2013).
Written Opinion of the International Preliminary Examining Authority dated Nov. 27, 2015, from International Patent Application No. PCT/US2014/071780, 9 pp.
Zhu et al., "Non-RCE3 subtest B.2—Results and Search Methods for Intra block copying for CU-level block vectors with TU-level prediction processing," JCTVC-P0218, 3 pp. (Jan. 2014).
Alshina et al., "AhG5: Intra block copy within one LCU," JCTVC-O0074, 5 pp. (Oct. 2013).
Alshina et al., "AhG5: On context modelling simplification for Intra_bc_flag coding," JCTVC-O0073, 3 pp. (Oct. 2013).
Anjanappa, "Performance Analysis and Implementation of Mode Dependent DCT/DST in H.264/AVC," Master of Science in Electrical Engineering, University of Texas at Arlington, 95 pp. (Dec. 2012).
Ballé et al., "Extended Texture Prediction for H.264 Intra Coding," ITU—Study Group 16 Question 6, VCEG-AE11, 7 pp. (Jan. 2007).
Bankoski et al., "VP8 Data Format and Decoding Guide," RFC 6386, 304 pp. (Nov. 2011).
Cha et al., "An Efficient Combined Inter and Intra Prediction Scheme for Video Coding," *Signal and Information Processing Association Annual Summit and Conf.*, 5 pp. (Oct. 2011).
Chen et al., "AHG8: Pseduo-PU-based Intra Block Copy," JCTVC-O0205, 4 pp. (Oct. 2013).
Chen et al., "Optimizing Intra/Inter Coding Mode Decisions," *Int'l Symp. on Multimedia Information Processing*, pp. 561-568 (Dec. 1997).
Cugnini, "3D CineCast—A curation about new media technologies," downloaded from the World Wide Web, 3 pp. (Jan. 2013).
Flynn et al., "High Efficiency Video Coding (HEVC) Range Extensions text specification: Draft 4," JCTVC-N1005, 322 pp. (Apr. 2013).
Flynn et al., "High Efficiency Video Coding (HEVC) Range Extensions text specification: Draft 5," JCTVC-O1005_v3, 347 pp. (Oct. 2013).
Guo, "RCE3: Summary Report of HEVC Range Extensions Core Experiment 3 on Intra Coding Methods for Screen Content," JCTVC-N0036, 4 pp. (Jul. 2013).
Hwang et al., "Fast Intra Prediction Mode Selection Scheme Using Temporal Correlation in H.264," *IEEE Tencon Conf.*, 5 pp. (Nov. 2005).
International Preliminary Report on Patentability dated Mar. 16, 2016, from International Patent Application No. PCT/US2014/071780, 10 pp.
ISO/IEC 11172-2, "Information technology—Coding of moving pictures and associated audio for digital storage media at up to about 1,5 Mbit/s—Part 2: Video," 122 pp. (Aug. 1993).
ISO/IEC 14496-2, "Information Technology—Coding of Audio-Visual Objects: Visual," ISO/IEC JTC1/SC29/WG11 N2202, 327 pp. (Mar. 1998).
ITU-T Recommendation H.261, "Video Codec for Audiovisual Services at p x 64 kbits," 29 pp. (Mar. 1993).
ITU-T Recommendation H.262, "Generic Coding of Moving Pictures and Associated Audio Information: Video," 218 pp. (Jul. 1995).
ITU-T Recommendation H.263, "Video coding for low bit rate communication," 167 pp. (Feb. 1998).
ITU-T Recommendation H.264, "Advanced video coding for generic audiovisual services," 680 pp. (Jan. 2012).
ITU-T Recommendation H.265, "High efficiency video coding," 317 pp. (Apr. 2013).
Jin et al., "Combined Inter-Intra Prediction for High Definition Video Coding," *Proc. of Picture Coding Symposium*, 4 pp. (Nov. 2007).
Kwon et al., "AHG5: Fast encoding using early skipping of Intra block copy (IntraBC) search," JCTVC-O0245, 9 pp. (Oct. 2013).
Kwon et al., "Non-RCE3: Intra motion compensation with variable length intra MV coding," JCTVC-N0206, 11 pp. (Jul. 2013).
Kwon et al., "RCE3: Results of test 3.3 in Intra motion compensation," JCTVC-N0205, 8 pp. (Jul. 2013).
Lainema et al., "AHG5: Sample masking for intra block copy," JCTVC-O0351, 3 pp. (Oct. 2013).
Laroche et al., "AHG5: Motion prediction for Intra Block Copy," JCTVC-O0122, 5 pp. (Oct. 2013).
Le Meur, "Video compression Beyond H.264, HEVC," University of Rennes 1, Powerpoint presentation, 65 pp. (Nov. 2011).
Li et al., "RDPCM operation unification and cleanup," JCTVC-O0185, 6 pp. (Oct. 2013).
Min et al., "Non-RCE3: Intra motion compensation for screen contents," JCTVC-N0285, 3 pp. (Jul. 2013).
Naccari et al., "AHG 8 Cross-check for JCTVC-N0231: Intra mode coding for screen contents," JCTVC-N0322, 3 pp. (Jul. 2013).
Pang et al., "AhG5: Constrained intra prediction for intra block copying," JCTVC-O0155, 6 pp. (Oct. 2013).
Pang et al., "Non-RCE3: Pipeline Friendly Intra Motion Compensation," JCTVC-N0254, 9 pp. (Jul. 2013).
Robert et al., "Improving Intra mode coding in H.264/AVC through block oriented transforms," *IEEE 8th Workshop on Multimedia Signal Processing*, 5 pp. (Oct. 2006).
Saxena et al., "HEVC Range Extensions Core Experiment 3 (RCE3): Intra Prediction techniques," JCTVC-N1123, 7 pp. (Jul. 2013).
Saxena et al., "Rext: On transform selection for Intra-BlockCopy blocks," JCTVC-O0053, 3 pp. (Oct. 2013).
SMPTE Standard, "VC-1 Compressed Video Bitstream Format and Decoding Process," SMPTE 421M-2006, 493 pp. (Feb. 2006).
Sullivan et al., "Overview of the High Efficiency Video Coding (HEVC) Standard," *IEEE Trans. on Circuits and Systems for Video Technology*, vol. 22, No. 12, pp. 1649-1668 (Dec. 2012).
Xu et al., "Intra-predictive Transforms for Image Coding," *IEEE Int'l Symp. on Circuits and Systems*, pp. 2822-2825 (May 2009).
Yu et al., "New Intra Prediction using Intra-Macroblock Motion Compensation," JVT-C151, 10 pp. (May 2002).
Zhu et al., "Initialization of block vector predictor for intra block copy," JCTVC-P0217_v2, 7 pp. (Jan. 2014).
Zhu et al., "Ping-Pong block vector predictor for intra block copy," JCTVC-Q0134, 5 pp. (Mar. 2014).
Chen et al., "Description of screen content coding technology proposal by NCTU and ITRI International," JCTVC-Q0032, 26 pp. (Mar. 2014).
Chen et al., "Description of screen content coding technology proposal by Qualcomm," JCTVC-Q0031, 18 pp. (Mar. 2014).
Cohen et al., "Description of screen content coding technology proposal by Mitsubishi Electric Corporation," JCTVC-Q0036, 25 pp. (Mar. 2014).
Dai et al., "Combined Inter-Frame and Inter-Color Prediction for Color Video Denoising," *IEEE Int'l Conf. on Multimedia and Expo*, pp. 884-889 (Jul. 2012).
Flynn et al., "High Efficiency Video Coding (HEVC) Range Extensions text specification: Draft 3," JCTVC-M1005_v1, 315 pp. (Apr. 2013).
Flynn et al., "High Efficiency Video Coding (HEVC) Range Extensions text specification: Draft 6," JCTVC-P1005_v1, 355 pp. (Jan. 2014).
"H.264 Video Compression," Visual Computing Systems, CMU 15-869, 29 pp. (Fall 2014).
Hu et al., "Screen Content Coding for HEVC Using Edge Modes," Mitsubishi Electric Research Laboratories TR2013-034, 7 pp. (May 2013).
ISO/IEC 14496-10, "Information Technology—Coding of audio-visual objects—Part 10: Advanced Video Coding," 720 pp. (May 2012).

(56) References Cited

OTHER PUBLICATIONS

ITU-R Recommendation BT.470-6, "Conventional Television Systems," 36 pp. (Nov. 1998).
ITU-R Recommendation BT.601-6, "Studio encoding parameters of digital television for standard 4:3 and wide-screen 16:9 aspect ratios," 13 pp. (Jan. 2007).
ITU-R Recommendation BT.709-5, "Parameter values for the HDTV standards for production and international programme exchange," 32 pp. (Apr. 2002).
ITU-R Recommendation BT.1358-1, "Studio parameters of 625 and 525 line progressive television systems," 11 pp. (Sep. 2007).
ITU-R Recommendation BT.1361, "Worldwide unified colorimetry and related characteristics of future television and imaging systems," 13 pp. (Feb. 1998).
ITU-R Recommendation BT.1701, "Characteristics of radiated signals of conventional analogue television systems," 7 pp. (Feb. 2005).
ITU-R Recommendation BT.2020, "Parameter values for ultra-high definition television systems for production and international programme exchange," 7 pp. (Aug. 2012).
ITU-T Recommendation H.271, "Video back-channel messages for conveyance of status information and requests from a video receiver to a video sender," 22 pp. (May 2006).
ITU-T Recommendation T.800, "Information technology—JPEG 2000 image coding system: Core coding system," 217 pp. (Aug. 2002).
Lai et al., "Description of screen content coding technology proposal by MediaTek," JCTVC-Q0033, 31 pp. (Mar. 2014).
Lainema et al., "Intra Coding of the HEVC Standard," *IEEE Trans. on Circuits and Systems for Video Technology*, vol. 22, No. 12, pp. 1792-1801 (Dec. 2012).
Laroche et al., "Text and results for block vector predictor for intra block copy," JCTVC-P0304_r1, 3 pp. (Jan. 2014).
Li et al., "Description of screen content coding technology proposal by Microsoft," JCTVC-Q0035, 27 pp. (Mar. 2014).
Li et al., "Hash-based intraBC search," JCTVC-Q0252, 2 pp. (Mar. 2014).
Ma et al., "Description of screen content coding technology proposal by Huawei Technologies, Inc.," JCTVC-Q0034, 14 pp. (Mar. 2014).
Marpe et al., "Video Compression Using Nested Quadtree Structures, Leaf Merging and Improved Techniques for Motion Representation and Entropy Coding," *IEEE Trans. on Circuits and Systems for Video Technology*, 10 pp. (Dec. 2010).
McCann et al., "Samsung's Response to the Call for Proposals on Video Compression Technology," JCTVC-A124, 40 pp. (Apr. 2010).
Meenderinck et al., "Parallel Scalability of H.264," *Workshop on Programmability Issues for Multi-Core Computers*, 12 pp. (Jan. 2008).
Mrak et al., "Improving Screen Content Coding in HEVC by Transform Skipping," *20th European Signal Processing Conference*, pp. 1209-1213 (Aug. 2012).
Oudin et al., "Block Merging for Quadtree-Based Video Coding," *IEEE Int'l Conf. on Multimedia and Expo*, 6 pp. (Jul. 2011).
"Pixel Padding Value and Pixel Padding Range Limit," downloaded from the World Wide Web on Dec. 5, 2014, 2 pp. (document not dated).
Sahin et al., "An Efficient Hardware Architecture for H.264 Intra Prediction Algorithm," *Design, Automation & Test in Europe Conference & Exhibition*, 6 pp. (Apr. 2007).
Sarwer et al., "Improved Intra Prediction of H.264/AVC," Effective Video Coding for Multimedia Applications, Ch. 3, pp. 39-54(Apr. 2011).
Sharman et al., "AHG5: Intra-block-copy in Non-4:4:4 Formats," JCTVC-Q0075, 5 pp. (Mar. 2014).
SMPTE Recommended Practice RP 177-1993, "Derivation of Basic Television Color Equations," 4 pp. (Nov. 1993).
Sullivan et al., "Meeting report of the 14th meeting of the Joint Collaborative Team on Video Coding," JCTVC-N_Notes_dA, 162 pp. (Jul. 2013).

Xiu et al., "Description of screen content coding technology proposal by InterDigital," JCTVC-Q0037, 30 pp. (Mar. 2014).
Yang, "HEVC (High Efficiency Video Coding)," TaipeiTech, CSIE Department, downloaded from the World Wide Web on Dec. 4, 2014, 66 pp. (document not dated).
Zhang et al., "Motion Vector Derivation of Deformable Block," *IEEE Int'l Conf. on Image Processing*, pp. 1549-1552 (Sep. 2012).
Zhao et al., "Efficient Realization of Parallel HEVC Intra Encoding," *Int'l Workshop on Programmability on Emerging Multimedia Systems and Applications*, 6 pp. (Jul. 2013).
Zhu et al., "AMP for Intra BC prediction," JCTVC-Q0135, 3 pp. (Mar. 2014).
Zhu et al., "Screen content coding using 2-D dictionary mode," JCTVC-O0357, 4 pp. (Oct. 2013).
Zou et al., "View Synthesis Prediction Using Skip and Merge Candidates for HEVC-based 3D Video Coding," *IEEE Int'l Symp. on Circuits and Systems*, 6 pp. (May 2013).
Liao et al., "A Low Complexity Architecture for Video Coding with Overlapped Block Motion Compensation," *Proc. of the 2010 IEEE 17th Int'l Conf. on Image Processing*, pp. 2041-2044 (Sep. 2010).
Ohm et al., "Comparison of the Coding Efficiency of Video Coding Standards—Including High Efficiency Video Coding (HEVC)," *IEEE Trans. on Circuits and Systems for Video Technology*, vol. 22, No. 12, pp. 1669-1684 (Dec. 2012).
Saxena et al., "Mode Dependent DCT/DST for Intra Prediction in Block-Based Image/Video Coding," *IEEE Int'l Conf. on Image Processing*, pp. 1685-1688 (2011).
Yang et al., "Remote Dynamic Three-Dimensional Scene Reconstruction," *PLoS One*, 12 pp. (May 2013).
Communication pursuant to Rules 161(1) and 162 EPC dated Aug. 10, 2016, from European Patent Application No. 14828410.2, 2 pp.
Lan et al., "Intra and Inter Coding Tools for Screen Contents," JCTVC-E145, 11 pp. (Mar. 2011).
Official Action dated Sep. 7, 2016, from Russian Patent Application No. 2016126179, 2 pp.
Chen et al., "AHG8: Line-based Intra Block Copy," JCTVC-O0205, 4 pp. (Oct. 2013).
Dai et al., "Efficient Block-Based Intra Prediction for Image Coding with 2D Geometrical Manipulations," *IEEE Int'l Conf. on Image Processing*, pp. 2916-2919 (Oct. 2008).
De Forni et al., "On the Benefits of Leaf Merging in Quad-Tree Motion Models," *IEEE Int'l Conf. on Image Processing*, vol. 2, pp. 858-861 (Sep. 2005).
Flynn et al., "High Efficiency Video Coding (HEVC) Screen Content Coding: Draft 1," JCTVC-R1005-v2, 360 pp. (Aug. 2014).
Flynn et al., "Text of ISO/IEC ISO/IEC 23008-2:201x/DAM1. HEVC Range Extensions," ISO/IEC JTC1/SC29/WG11 N13763, 321 pp. (Aug. 2013).
Iwata et al., "Intra Prediction Based on Repetitive Pixel Replenishment with Adaptive Block Size," JCTVC-D251, 4 pp. (Jan. 2011).
Kim et al., "High Efficiency Video Coding (HEVC) Test Model 13 (HM13) Encoder Description," JCTVC-O1002, 36 pp. (Oct. 2013).
Lai et al., "AHG14: Intra Block Copy Reference Area for Wavefront Parallel Processing (WPP)," JCTVC-S0101, 4 pp. (Oct. 2014).
Laroche et al., "AHG14: On IBC Constraint for Wavefront Parallel Processing," JCTVC-S0070, 5 pp. (Oct. 2014).
Li et al., "On WPP with Palette Mode and Intra BC Mode," JCTVC-S0088, 8 pp. (Oct. 2014).
Rapaka et al., "On Parallel Processing Capability of Intra Block Copy," JCTVC-S0220, 5 pp. (Oct. 2014).
Sullivan et al., "Meeting Report of the 18th Meeting of the Joint Collaborative Team on Video Coding (JCT-VC), Sapporo, JP, Jun. 30-Jul. 9, 2014," JCTVC-R_Notes_dE, 199 pp. (Jun. 2014).
Sullivan et al., "Meeting Report of the 19th Meeting of the Joint Collaborative Team on Video Coding (JCT-VC), Strasburg, FR, Oct. 17-24, 2014," JCTVC-S1000, 203 pp. (Oct. 2014).
Tseng et al., "A Motion Vector Coding Scheme Based on Bottom-up Merging Procedure," *IEEE Int'l Conf. on Advances in Multimedia*, pp. 125-129 (Jul. 2009).
Xu et al., "On Unification of Intra Block Copy and Inter-picture Motion Compensation," JCTVC-Q0132, v5, 14 pp. (Jan. 2014).
Okubo et al., "H.264/AVC Textbook," Impress Standard Textbook Series, pp. 145-147 (Jan. 2009).

(56) References Cited

OTHER PUBLICATIONS

Wiegand et al., "Joint Final Committee Draft (JFCD) of Joint Video Specification (ITU-T Rec. H.264 I ISO/IEC 14496-10 AVC)," JVT-D157, 218 pp. (Jul. 2002).
Clare et al., "Wavefront Parallel Processing for HEVC Encoding and Decoding," JCTVC-F274, 16 pp. (Jul. 2011).
Kwon et al., "Fast Intra Block Copy (IntraBC) Search for HEVC Screen Content Coding," *IEEE Int'l Symp. on Circuits and Systems*, pp. 9-12 (Jun. 2014).
Lai et al., "Non-RCE4: Major Color Table (Palette) Merge from Above and Left CU," JCTVC-P0152_r2, 7 pp. (Jan. 2014).
Lai et al., "Non-RCE4: Major Color Table (Palette) Sharing," JCTVC-P0153, 6 pp. (Jan. 2014).
Murakami et al., "High Efficiency Video Coding Techniques: HEVC/H265 and the Applications Thereof," 4 pp. (Feb. 2013).
Office Action dated Feb. 1, 2018, from Mexican Patent Application No. MX/a/2016/008786, 4 pp. (MS# 340989-MX-PCT).
Pang et al., "Non-RCE3: 2-D MV Supported Intra Motion Compensation," JCTVC-N0256, 5 pp. (Jul. 2013).
Qi et al., "A Study on the Motion Vector Prediction Schemes for AVS," *Visual Communications and Image Processing*, 8 pp. (Jul. 2005).
Seregin et al., "Non-SCCE3: Palette Predictor Resetting," JCTVC-R0229r1, 4 pp. (Jun. 2014).
An, "Column-Based RLE in Row-Oriented Database," *Proc. of Cyber-Enabled Distributed Computing and Knowledge Discovery*, pp. 309-315 (Oct. 2009).
Bross et al., "The New High-Efficiency Video Coding Stanard," *SMPTE Motion Imaging Journal*, Technical Paper, pp. 25-35 (May 2013).
Communication pursuant to Rules 161(2) and 162 EPC dated May 23, 2016, from European Patent Application No. 13895569.5, 2 pp.
Communication pursuant to Rules 161(2) and 162 EPC dated May 23, 2016, from European Patent Application No. 13895617.2, 2 pp.
Communication pursuant to Rules 70(2) and 70a(2) EPC dated May 19, 2017, from European Patent Application No. 13895617.2, 1 p.
Communication pursuant to Article 94(3) EPC dated Feb. 14, 2017, from European Patent Application No. 14884614.0, 7 pp.
Communication pursuant to Article 94(3) EPC dated Apr. 6, 2017, from European Patent Application No. 14895133.8, 5 pp.
Communication pursuant to Article 94(3) EPC dated Jan. 5, 2018, from European Patent Application No. 14903497.7, 8 pp.
Communication pursuant to Article 94(3) EPC dated Aug. 10, 2018, from European Patent Application No. 16704504.6, 8 pp.
Communication pursuant to Rule 164(1) EPC dated Aug. 17, 2017, from European Patent Application No. 14876901.1, 12 pp.
Decision of Refusal dated Jan. 22, 2019, from Japanese Patent Application No. 2017-517017, 10 pp.
Decision on Grant dated Nov. 23, 2018, from Russian Patent Application No. 2017110397, 18 pp.
Decision to Grant dated Aug. 1, 2018, from Russian Patent Application No. 2016125260, 25 pp.
Examination Report dated Jun. 12, 2018, from Australian Patent Application No. 2015206771, 4 pp.
Examination Report dated Jun. 18, 2018, from Australian Patent Application No. 2013403224, 3 pp.
Examination Report dated Jul. 5, 2018, from Australian Patent Application No. 2014376061, 4 pp.
Examination Report dated Aug. 9, 2018, from Australian Patent Application No. 2014374141, 3 pp.
Examination Report dated Sep. 3, 2018, from Australian Patent Application No. 2014385769, 5 pp.
Examination Report No. 2 dated Oct. 3, 2018, from Australian Patent Application No. 2014376061, 4 pp.
Extended European Search Report dated Nov. 17, 2017, from European Patent Application No. 14876901.1, 10 pp.
Final Office Action dated Dec. 1, 2016, from U.S. Appl. No. 14/455,856, 23 pp.
Final Office Action dated Oct. 25, 2017, from U.S. Appl. No. 14/455,856, 29 pp.
Final Office Action dated Sep. 18, 2018, from U.S. Appl. No. 15/107,712, 27 pp.
Final Office Action dated Oct. 9, 2018, from U.S. Appl. No. 15/319,797, 18 pp.
Final Office Action dated Nov. 27, 2018, from U.S. Appl. No. 15/029,469, 15 pp.
Flynn et al., "High Efficiency Video Coding (HEVC) Range Extensions Text Specification: Draft 5," JCTVC-O1005_v4, 346 pp. (Oct. 2013).
Gisquet et al., "SCCE3 Test A.3: palette stuffing," JCTVC-R0082, pp. 1-5 (Jun. 2014).
International Preliminary Report on Patentability dated Apr. 28, 2016, from International Patent Application No. PCT/CN2013/085165, 10 pp.
International Preliminary Report on Patentability dated Apr. 14, 2016, from International Patent Application No. PCT/US2015/010944, 8 pp.
International Preliminary Report on Patentability dated Apr. 28, 2016, from International Patent Application No. PCT/CN2013/085170, 5 pp.
International Preliminary Report on Patentability dated Jul. 14, 2016, from International Patent Application No. PCT/CN2014/070072, 9 pp.
International Preliminary Report on Patentability dated Sep. 15, 2016, from International Patent Application No. PCT/CN2014/072824, 7 pp.
International Preliminary Report on Patentability dated Dec. 29, 2016, from International Patent Application No. PCT/CN2014/080302, 6 pp.
International Preliminary Report on Patentability dated Apr. 13, 2017, from International Patent Application No. PCT/CN2014/087885, 6 pp.
International Preliminary Report on Patentability dated Apr. 5, 2017, from International Patent Application No. PCT/US2016/013500, 15 pp.
International Search Report and Written Opinion dated Aug. 5, 2014, from International Patent Application No. PCT/CN2013/085165, 20 pp.
International Search Report and Written Opinion dated Jul. 16, 2014, from International Patent Application No. PCT/CN2013/085170, 11 pp.
International Search Report and Written Opinion dated May 11, 2015, from International Patent Application No. PCT/US2015/010944, 11 pp.
International Search Report and Written Opinion dated Mar. 20, 2015, from International Patent Application No. PCT/CN2014/080302, 12 pp.
International Search Report and Written Opinion dated Dec. 2, 2014, from International Patent Application No. PCT/CN2014/072824, 14 pp.
International Search Report and Written Opinion dated Oct. 10, 2014, from International Patent Application No. PCT/CN2014/070072, 16 pp.
International Search Report and Written Opinion dated Jun. 15, 2015, from International Patent Application No. PCT/CN2014/087885, 13 pp.
International Search Report and Written Opinion dated Mar. 30, 2016, from International Patent Application No. PCT/US2016/013500, 14 pp.
Lan et al., "Compress Compound Images in H.264/MPGE-4 AVC by Exploiting Spatial Correlation," *IEEE Trans. on image Processing*. vol. 19, No. 4, pp. 946-957 (Apr. 2010).
Lan et al., "Screen content coding," JCTVC-B084_r1, 10 pp. (Jul. 2010).
Lan et al., "Screen content coding results using TMuC," JCTVC-C276, 6 pp. (Oct. 2010).
Marpe et al., "Context-Based Adaptive Binary Arithmetic Coding in the H.264/AVC Video Compression Standard," *IEEE Trans. on Circuits and Systems for Video Technology*, vol. 13, No. 7, pp. 620-636 (Jul. 2003).
Misra et al., "Modifications to palette coding for tiles/slices/dependent slicse/wavefronts," JCTVC-R0233, 4 pp. (Jun. 2014).

(56) References Cited

OTHER PUBLICATIONS

Misra et al., "Using the wavefront store-and-sync design for palette table prediction variables," JCTVC-S0141_r1, 6 pp. (Oct. 2014).
Notice on the First Office Action dated Jun. 1, 2018, from Chinese Patent Application No. 201480072229.4, 10 pp.
Naccari et al., "HEVC Range extensions test model 5 encoder description," JCTVC-O1013, pp. 1-16 (Oct. 2013).
Notice of Acceptance dated Aug. 13, 2018, from Australian Patent Application No. 2015206771, 3 pp.
Notice of Acceptance dated Oct. 4, 2018, from Australian Patent Application No. 2013403224, 3 pp.
Notice of Acceptance dated Oct. 29, 2018, from Australian Patent Application No. 2014374141, 3 pp.
Notice of Acceptance dated Nov. 26, 2018, from Australian Patent Application No. 2014385769, 3 pp.
Notice of Allowance dated Jul. 11, 2018, from Mexican Patent Application No. MX/a/2016/008786, 2 pp.
Notice of Allowance dated Oct. 25, 2016, from U.S. Appl. No. 14/607,056, 16 pp.
Notice of Allowance dated Jul. 12, 2018, from Mexican Patent Application No. MX/a/2016/008784, 2 pp.
Notice of Allowance dated Jul. 13, 2018, from Mexican Patent Application No. MX/a/2016/011296, 2 pp.
Notice of Reasons for Rejection dated Aug. 29, 2017, from Japanese Patent Application No. 2016-522798, 10 pp.
Notice of Reasons for Rejection dated Dec. 5, 2017, from Japanese Patent Application No. 2016-555545, 8 pp.
Notice on the Third Office Action dated Jun. 7, 2018, from Chinese Patent Application No. 201580004941.5, 6 pp.
Notification of Reasons for Refusal dated Nov. 21, 2017, from Japanese Patent Application No. 2016-544442, 16 pp.
Notification of Reasons for Refusal dated Jan. 16, 2018, from Japanese Patent Application No. 2016-522798, 11 pp.
Notice on the First Office Action dated Jun. 1, 2017, from Chinese Patent Application No. 201580004941.5, 13 pp.
Notice on the First Office Action dated Sep. 30, 2017, from Chinese Patent Application No. 201480029735.5, 15 pp.
Notice on the First Office Action dated Jan. 2, 2018, from Chinese Patent Application No. 201480048017.2, 12 pp.
Notice on the First Office Action dated Mar. 28, 2018, from Chinese Patent Application No. 201380080239.8, 13 pp.
Notice on the Second Office Action dated Jan. 2, 2018, from Chinese Patent Application No. 201580004941.5, 8 pp.
Notice on the First Office Action dated May 3, 2018, from Chinese Patent Application No. 201480071878.2, 14 pp.
Notice on the First Office Action dated May 8, 2018, from Chinese Patent Application No. 201380080240.0, 11 pp.
Notice on the First Office Action dated Jun. 27, 2018, from Chinese Patent Application No. 201480072214.8, 14 pp.
Notice on the Second Office Action dated Jul. 3, 2018, from Chinese Patent Application No. 201480029735.5, 16 pp.
Notice on the Second Office Action dated Aug. 17, 2018, from Chinese Patent Application No. 201480048017.2, 14 pp.
Notice on the Second Office Action dated Nov. 14, 2018, from Chinese Patent Application No. 201380080239.8, 16 pp.
Notice on the Second Office Action dated Dec. 4, 2018, from Chinese Patent Application No. 201480071878.2, 14 pp.
Notice on the Fourth Office Action dated Dec. 12, 2018, from Chinese Patent Application No. 201580004941.5, 8 pp.
Notice on the Third Office Action dated Jan. 18, 2019, from Chinese Patent Application No. 2014/0048017.2, 10 pp.
Notification of Reasons for Refusal dated Jun. 5, 2018, from Japanese Patent Application No. 2017-517017, 12 pp.
Notification of Reasons for Refusal dated Jul. 17, 2018, from Japanese Patent Application No. 2016-544439, 12 pp.
Notification of Reasons for Refusal dated Dec. 4, 2018, from Japanese Patent Application No. 2016-545841, 7 pp.
Office Action dated Feb. 8, 2018, from Mexican Patent Application No. MX/a/2016/011296, 5 pp. (Ms# 341274-MX-PCT).
Office Action dated Jan. 31, 2018, from Mexican Patent Application No. MX/a/2016/008784, 6 pp.
Office Action dated Feb. 8, 2018, from Mexican Patent Application No. MX/a/2016/009128, 4 pp.
Office Action and Search Report dated Jul. 17, 2018, from Russian Patent Application No. 2017110397, 11 pp.
Office Action and Search Report dated Aug. 30, 2018, from Russian Patent Application No. 2016126179, 7 pp.
Office Action and Search Report dated Aug. 31, 2018, from Russian Patent Application No. 2016128834, 10 pp.
Office Action dated May 20, 2016, from U.S. Appl. No. 14/455,856, 17 pp.
Office Action dated Mar. 23, 2017, from U.S. Appl. No. 14/455,856, 26 pp.
Office Action dated May 17, 2018, from U.S. Appl. No. 14/455,856, 22 pp.
Office Action dated Mar. 13, 2018, from U.S. Appl. No. 15/029,469, 13 pp.
Office Action dated Jan. 26, 2018, from U.S. Appl. No. 15/107,712, 25 pp.
Office Action dated Apr. 13, 2018, from U.S. Appl. No. 15/319,797, 14 pp.
Office Action dated Nov. 7, 2018, from U.S. Appl. No. 15/025,032, 16 pp.
Office Action dated Oct. 5, 2018, from U.S. Appl. No. 15/025,128, 18 pp.
Official Action dated Aug. 19, 2016, from Russian Patent Application No. 2016125260, 3 pp. [English translation not available].
Official Action dated Sep. 6, 2016, from Russian Patent Application No. 2016128834, 2 pp. [English translation not available].
Official Action dated Nov. 1, 2016, from Russian Patent Application No. 2016135632, 3 pp. [English translation not available].
Official Action dated Oct. 11, 2017, from Russian Patent Application No. 2016114182, 7 pp.
Official Action dated Nov. 27, 2017, from Russian Patent Application No. 2016125260, 11 pp.
Official Action dated Apr. 13, 2018, from Russian Patent Application No. 2016125260, 4 pp.
Official Action dated Dec. 8, 2017, from Russian Patent Application No. 2016135632, 10 pp.
Okubo et al., "H.265/HEVC Textbook," Impress Standard Textbook Series, pp. 108-111 (Oct. 2013).
Pu et al., "SCCE3: Test B.12—Bimarization of Escape Sample and Palette Index," JCTVC-R0065, 3 pp. (Jun. 2014).
Search Report dated Jan. 25, 2017, from European Patent Application No. 14884614.0, 4 pp.
Search Report dated Mar. 20, 2017, from European Patent Application No. 14895133.8, 3 pp.
Search Report dated Oct. 18, 2017, from European Patent Application No. 17175228.0, 10 pp.
Shen et al., "Low-Cost Realtime Screen Sharing to Multiple Clients," *IEEE Int'l conf. on Mulimedia and Expo*, pp. 980-985 (Jul. 2010).
Sun et al., "AHG10: A triplet palette mode combining JCTVC-P0108 and JCTVC-P0198," JCTVC-Q0083, pp. 1-9 (Mar. 2014).
Sun et al., "Non-RCE4: Cross-CU major color index prediction," JCTVC-P0093r2, pp. 1-5 (Jan. 2014).
Supplementary Partial European Search Report dated Apr. 6, 2017, from European Patent Application No. 13895569.5, 7 pp.
Supplementary Partial European Search Report dated May 3, 2017, from European Patent Application No. 13895617.2, 11 pp.
Supplementary European Search Report dated Jul. 13, 2017, from European Patent Application No. 13895569.5, 9 pp.
Supplementary European Search Report dated Nov. 20, 2017, from European Patent Application No. 14903497.7, 8 pp.
Written Opinion of the International Preliminary Examining Authority dated Dec. 23, 2015, from International Patent Application No. PCT/US2015/010944, 7 pp.
Written Opinion of the International Preliminary Examining Authority dated Dec. 12, 2016, from International Patent Application No. PCT/US2016/013500, 8 pp.
Decision to Grant dated Jan. 25, 2019, from Russian Patent Application No. 2016126179, 23 pp.

(56) References Cited

OTHER PUBLICATIONS

Notification of Reasons for Refusal dated Mar. 5, 2019, from Japanese Patent Application No. 2016-544439, 14 pp.
Notice on the Second Office Action dated Feb. 19, 2019, from Chinese Patent Application No. 201480072229.4, 6 pp.
Decision to Grant dated Mar. 5, 2019, from Japanese Patent Application No. 2018-031280, 3 pp.
Decision to Grant dated Jan. 31, 2019, from European Patent Application No. 13895617.2, 2 pp.
Decision to Grant dated Jan. 28, 2019, from Russian Patent Application No. 2016128834, 28 pp.
Final Office Action dated Feb. 6, 2019, from U.S. Appl. No. 14/455,856, 24 pp.
Notice on Grant of Patent dated Feb. 13, 2019, from Chinese Patent Application No. 201380080240.0, 4 pp.
Notice on the Third Office Action dated Mar. 15, 2019, from Chinese Patent Application No. 201380080239.8, 8 pp.
Notice on the Second Office Action dated Mar. 5, 2019, from Chinese Patent Application No. 201480072214.8, 6 pp.

* cited by examiner software 180 implementing one or more innovations for block vector prediction and/or encoder-side options for intra block copy prediction

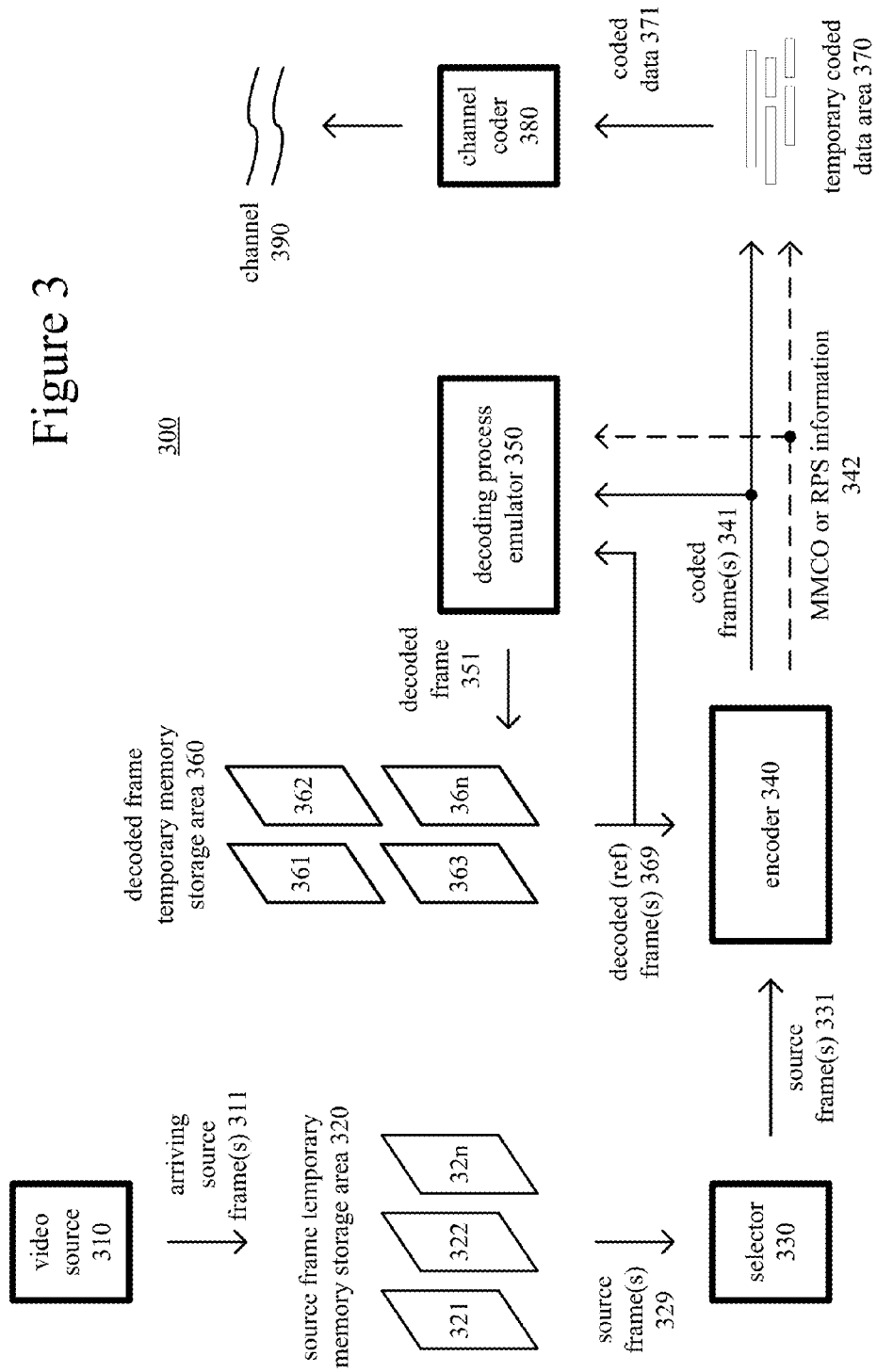

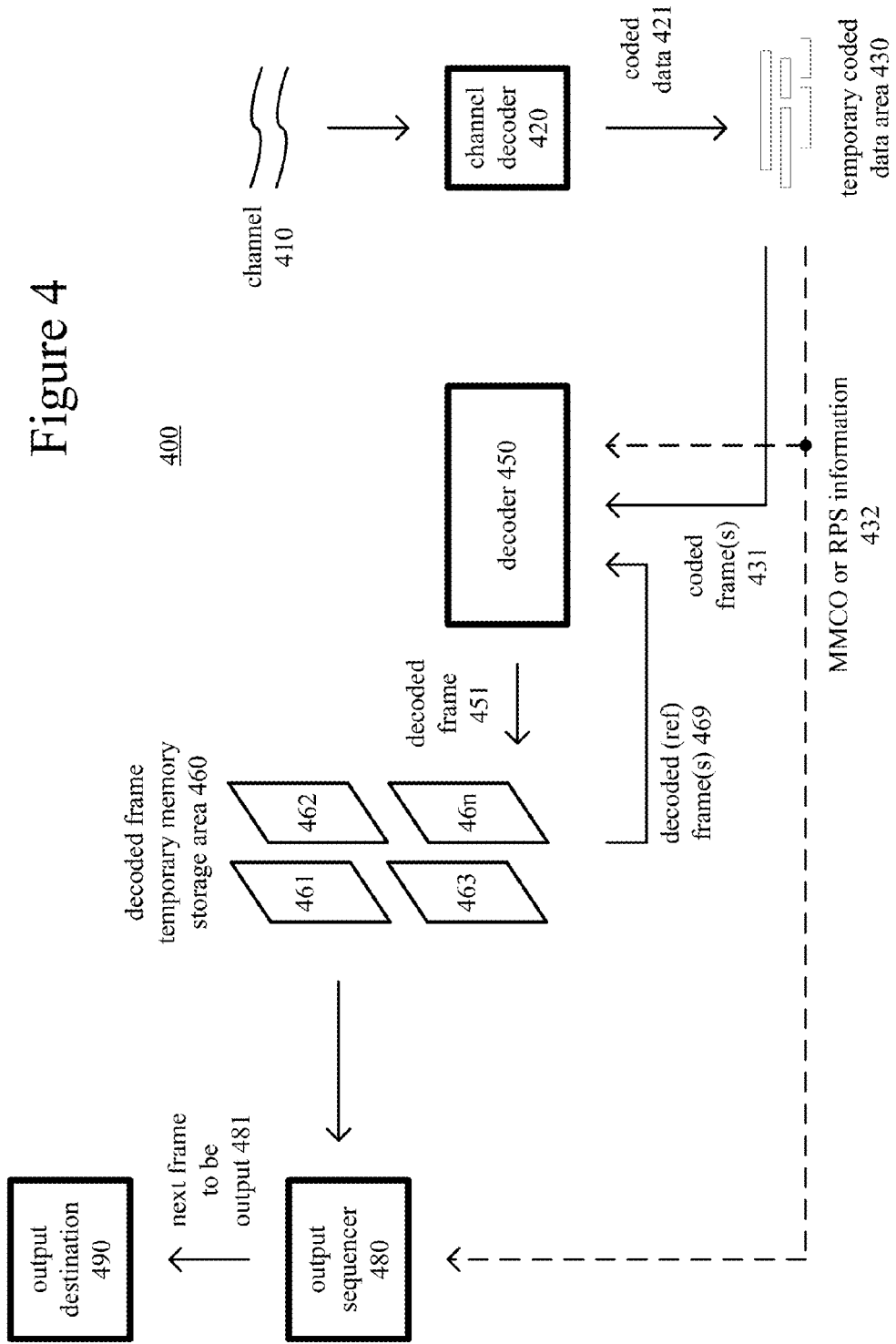

600 block vector (740) for current block (730) of current frame (710), indicating a displacement to a region (750) in the current frame (710)

candidate block vectors (842, 844) indicating displacements to regions that are outside of search range for current block (830) of current frame (810)

1000 z-scan order for current block and blocks that may include bottom right position of the region for a BV Figure 11
1100
BV buffer 0:     BV buffer 1:
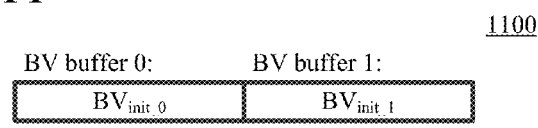
Figure 12
1200
| index value: | BV predictor: |
|---|---|
| idx 0 : | first candidate BV value ($BV_{init\_0}$) |
| idx 1 : | second candidate BV value ($BV_{init\_1}$) |
Figure 13
1300
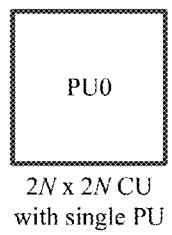
$2N \times 2N$ CU with single PU
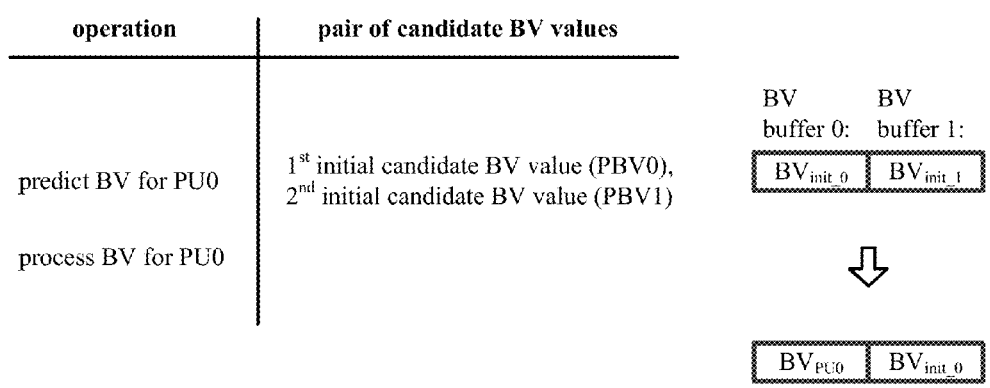

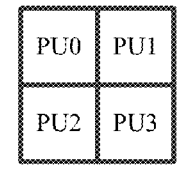

2N x 2N CU with
four N x N PUs

| operation | pair of candidate BV values |
|---|---|
| predict BV for PU0 | 1st initial candidate BV value (PBV0), 2nd initial candidate BV value (PBV1) |
| process BV for PU0 | |
| predict BV for PU1 | BV for PU0, 1st initial candidate BV value (PBV1) |
| process BV for PU1 | |
| predict BV for PU2 | BV for PU1, BV for PU0 |
| process BV for PU2 | |
| predict BV for PU3 | BV for PU1, BV for PU2 |
| process BV for PU3 | |

BV buffer 0:   BV buffer 1:

| $BV_{init\_0}$ | $BV_{init\_1}$ |

⇩

| $BV_{PU0}$ | $BV_{init\_0}$ |

⇩

| $BV_{PU1}$ | $BV_{PU0}$ |

⇩

| $BV_{PU1}$ | $BV_{PU0}$ |

1500

2N x 2N CU with two N x 2N PUs  2N x 2N CU with two 2N x N PUs

| operation | pair of candidate BV values |
|---|---|
| predict BV for PU0 | $1^{st}$ initial candidate BV value (PBV0), $2^{nd}$ initial candidate BV value (PBV1) |
| process BV for PU0 | |
| predict BV for PU1 | BV for PU0, $1^{st}$ initial candidate BV value (PBV0) |
| process BV for PU1 | |

BV buffer 0:   BV buffer 1:

$BV_{init\_0}$   $BV_{init\_1}$

⇩

$BV_{PU0}$   $BV_{init\_0}$

⇩

$BV_{PU1}$   $BV_{PU0}$

Figure 18    1800
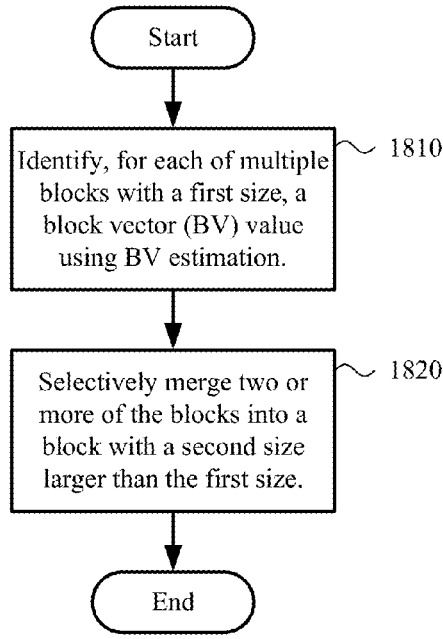
Figure 20    2000
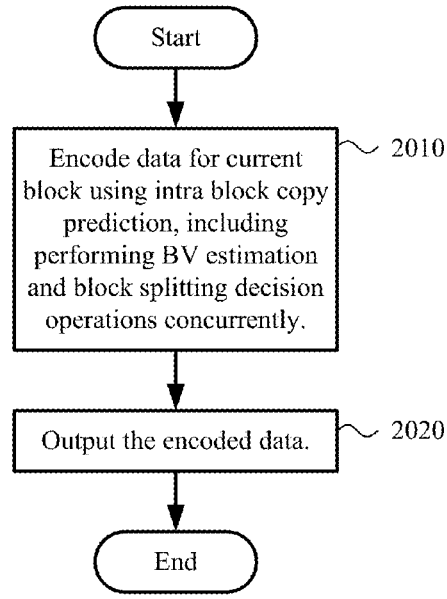
Figure 19    1900
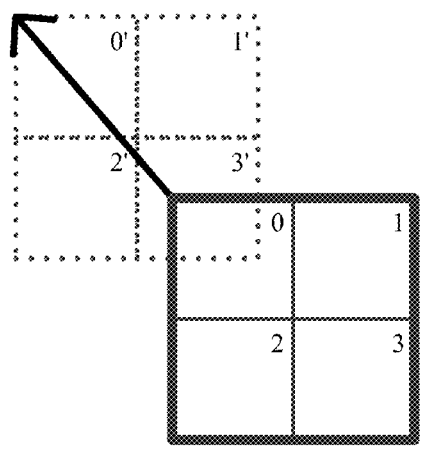

2m x 2n
block 2210

2m x 2n
block 2210

US 10,390,034 B2

INNOVATIONS IN BLOCK VECTOR PREDICTION AND ESTIMATION OF RECONSTRUCTED SAMPLE VALUES WITHIN AN OVERLAP AREA

RELATED APPLICATION

This application claims the benefit of U.S. Provisional Patent Application No. 61/923,628, filed Jan. 3, 2014, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the HEVC standard (ITU-T H.265 or ISO/IEC 23008-2) has been approved. Extensions to the HEVC standard (e.g., for scalable video coding/decoding, for coding/decoding of video with higher fidelity in terms of sample bit depth or chroma sampling rate, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

Intra block copy ("BC") is a prediction mode under development for HEVC extensions. For intra BC prediction mode, the sample values of a current block of a picture are predicted using previously reconstructed sample values in the same picture. A block vector ("BV") indicates a displacement from the current block to a region of the picture that includes the previously reconstructed sample values used for prediction. The BV is signaled in the bitstream. Intra BC prediction is a form of intra-picture prediction—intra BC prediction for a block of a picture does not use any sample values other than sample values in the same picture.

As currently specified in draft extensions to the HEVC standard and implemented in some reference software for the draft extensions to the HEVC standard, intra BC prediction mode has several problems. For example, encoder-side decisions about how to use intra BC prediction are not made effectively. As another example, BV values are not signaled efficiently in many scenarios.

SUMMARY

In summary, the detailed description presents innovations in encoder-side operations for intra block copy ("BC") prediction mode. For example, some of the innovations relate to ways of estimating reconstructed sample values within an overlap area of a current block during block vector ("BV") estimation. Other innovations relate to prediction of BV values during encoding or decoding using a "ping-pong" approach, in which an encoder or decoder selects between a pair of candidate BV values when predicting the BV value for a block.

According to a one aspect of the innovations described herein, an encoder or decoder processes a coding unit ("CU") of a current picture, where the CU has four prediction units ("PUs"). The CU is a set of one or more blocks for purposes of encoding and decoding, generally, and each of the PUs is a set of one or more blocks, within the CU, for purposes of signaling of prediction information and/or prediction processing. For each of the four PUs, the encoder or decoder (1) predicts a BV value using one of a pair of candidate BV values, where a flag value indicates the selection between the pair of candidate BV values, and (2) processes the BV value for the PU using the predicted BV value. The pair of candidate BV values can be different for different PUs of the CU. For example, for the first PU, the pair of candidate BV values includes a first initial candidate BV value (labeled $BV_{init\_0}$) and a second initial candidate BV value (labeled $BV_{init\_1}$). For the second PU, the pair of candidate BV values includes the BV value for the first PU and $BV_{init\_0}$. For the third PU, the pair of candidate BV values includes the BV values for the first and second PUs of the current CU. Finally, for the fourth PU, the pair of candidate BV values includes the BV values for the second and third PUs of the current CU. For a subsequent CU of the current picture, however, the pair of candidate BV values includes the BV values for the first and second PUs of the current CU (even though the BV values for the first and second PUs of the current CU were processed before the BV values for the third and fourth PUs of the current CU).

According to another aspect of the innovations described herein, an encoder or decoder processes multiple CUs of a current picture. At least one of the CUs has a single PU, and at least one of the CUs has multiple PUs. For a given CU of the multiple CUs, if the given CU has a single PU, the encoder or decoder (1) predicts a BV value using one of a pair of candidate BV values (including a first initial candidate BV value stored in a first BV buffer and a second initial candidate BV value stored in a second BV buffer), where a flag value indicates the selection between the pair of candidate BV values, and (2) processes the BV value for the single PU using the predicted BV value. In doing so, the encoder or decoder selectively updates the first BV buffer and the second BV buffer depending on whether the BV value for the PU equals the BV value stored in the first BV buffer.

Otherwise (the given CU has multiple PUs), for each of the PUs, the encoder or decoder (1) predicts a BV value using one of the pair of candidate BV values, where a flag value indicates the selection between the pair of candidate BV values, and (2) processes the BV value for the PU using the predicted BV value. The pair of candidate BV values can be different for different PUs. If the PU is a first or second PU of the given CU, the encoder or decoder selectively updates the first BV buffer and the second BV buffer depending on whether the BV value for the PU equals the BV value stored in the first BV buffer. For a third PU or fourth PU of the given CU, the encoder skips updating the BV buffers.

According to another aspect of the innovations described herein, an encoder estimates reconstructed sample values within an overlap area of a current block of a picture. The current block has multiple smaller blocks. The overlap area covers parts of the current block that are in potential intra-prediction regions for at least one of the multiple smaller blocks. The encoder then performs BV estimation to determine a BV value for the current block. The BV estimation uses at least some of the estimated reconstructed sample values within the overlap area of the current block.

The innovations for BV prediction and encoder-side options for intra BC prediction mode can be implemented as part of a method, as part of a computing device adapted to perform the method or as part of a tangible computer-readable media storing computer-executable instructions for causing a computing device to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 4 is a diagram of an example decoder system in conjunction with which some described embodiments can be implemented.

FIG. 11 is a diagram illustrating candidate BV values in BV buffers, and FIG. 12 is a diagram illustrating candidate BV values in another data structure.

FIG. 13 is a diagram illustrating an example of BV prediction for a 2N×2N PU of a 2N×2N CU according to example ping-pong approaches.

FIG. 14 is a diagram illustrating examples of BV prediction for N×N PUs of a 2N×2N CU according to example ping-pong approaches.

FIG. 18 is a flowchart illustrating a generalized technique for selectively merging blocks into a larger block during BV estimation.

FIG. 19 is a diagram illustrating an advantage of selectively merging blocks into a larger block during BV estimation.

FIG. 20 is a flowchart illustrating a generalized technique for concurrently performing BV estimation and making block splitting decisions for a block.

DETAILED DESCRIPTION

The detailed description presents innovations in block vector ("BV") prediction during encoding and decoding, and in encoder-side decisions for intra block copy ("BC") prediction mode during encoding. In particular, the detailed description presents innovations for estimating sample values within an overlap area of a current block during BV estimation. The detailed description also presents innovations for BV prediction during encoding or decoding using "ping-pong" approaches, according to which an encoder or decoder selects between a pair of candidate BV values when predicting the BV value for a block.

Although operations described herein are in places described as being performed by a video encoder or video decoder, in many cases the operations can be performed by another type of media processing tool (e.g., image encoder or image decoder).

Some of the innovations described herein are illustrated with reference to syntax elements and operations specific to the HEVC standard. For example, reference is made to the draft version JCTVC-O1005 of the HEVC standard—"High Efficiency Video Coding (HEVC) Range Extensions Text Specification: Draft 5," JCTVC-O1005-v3, November 2013. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
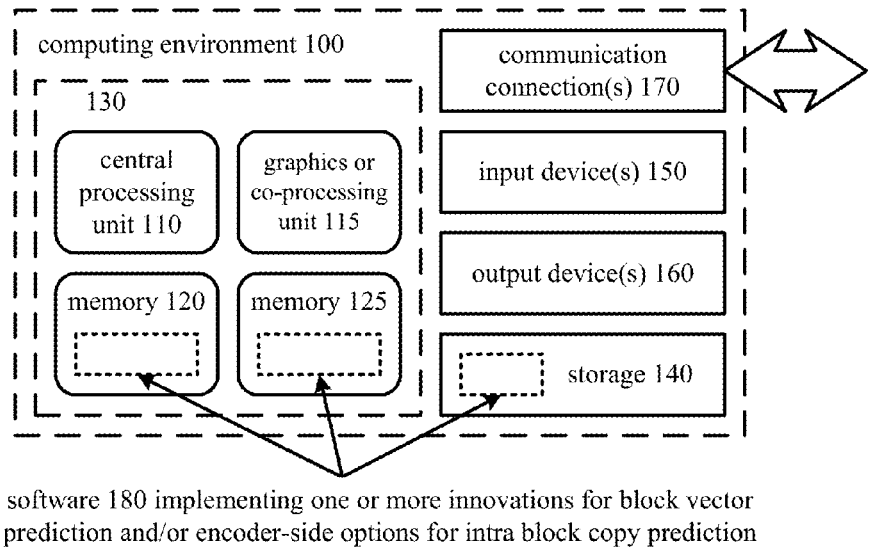
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for BV prediction and/or estimating sample values within an overlap area of a current block during BV estimation, or other encoder-side options for intra BC prediction mode, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for BV prediction and/or estimating sample values within an overlap area of a current block during BV estimation, or other encoder-side options for intra BC prediction mode.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation. As used herein, the term "optimiz*" (including variations such as optimization and optimizing) refers to a choice among options under a given scope of decision, and does not imply that an optimized choice is the "best" or "optimum" choice for an expanded scope of decisions.

II. Example Network Environments.

Figure 2A:
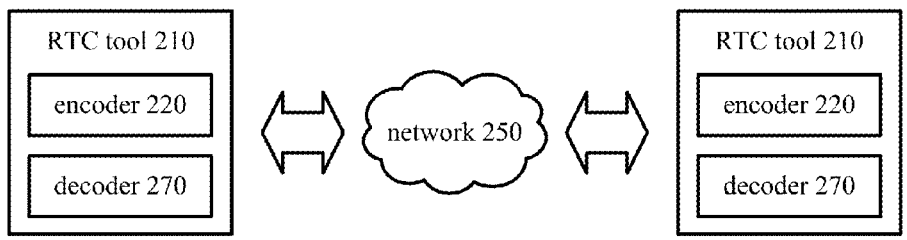
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the HEVC standard (also known as H.265), SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using intra BC prediction mode.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame is de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The chroma sample values may be sub-sampled to a lower chroma sampling rate (e.g., for YUV 4:2:0 format or YUV 4:2:2), or the chroma sample values may have the same resolution as the luma sample values (e.g., for YUV 4:4:4 format). In YUV 4:2:0 format, chroma components are downsampled by a factor of two horizontally and by a factor of two vertically. In YUV 4:2:2 format, chroma components are downsampled by a factor of two horizontally. Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of HEVC format (H.265), Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. As used herein, the term "block" can indicate a CB, PB, TB or other set of sample values, depending on context. The encoder decides how to partition video into CTUs, CUs, PUs, TUs, etc.

Returning to FIG. 3, the encoder represents an intra-coded block of a source frame (331) in terms of prediction from other, previously reconstructed sample values in the frame (331). For intra BC prediction, an intra-picture estimator estimates displacement of a block with respect to the other, previously reconstructed sample values. An intra-frame prediction reference region (or intra-prediction region, for short) is a region of samples in the frame that are used to generate BC-prediction values for the block. The intra-frame prediction region can be indicated with a block vector ("BV") value (determined in BV estimation). For intra spatial prediction for a block, the intra-picture estimator estimates extrapolation of the neighboring reconstructed sample values into the block. The intra-picture estimator can output prediction information (such as BV values for intra BC prediction or prediction mode (direction) for intra spatial prediction), which is entropy coded. An intra-frame prediction predictor applies the prediction information to determine intra prediction values.

The encoder (340) represents an inter-frame coded, predicted block of a source frame (331) in terms of prediction from reference frames. A motion estimator estimates the motion of the block with respect to one or more reference frames (369). When multiple reference frames are used, the multiple reference frames can be from different temporal directions or the same temporal direction. A motion-compensated prediction reference region is a region of samples in the reference frame(s) that are used to generate motion-compensated prediction values for a block of samples of a current frame. The motion estimator outputs motion information such as motion vector ("MV") information, which is entropy coded. A motion compensator applies MVs to reference frames (369) to determine motion-compensated prediction values for inter-frame prediction.

The encoder can determine the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, BV values, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding process emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems.

FIG. 4 is a block diagram of an example decoder system (400) in conjunction with which some described embodiments can be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include content encoded using intra BC prediction mode.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, intra-frame prediction, motion-compensated inter-frame prediction, inverse quantization, inverse frequency transforms, and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra-frame prediction module can spatially predict sample values of a current block from neighboring, previously reconstructed sample values or, for intra BC prediction, predict sample values of a current block using previously reconstructed sample values of an intra-frame prediction region in the frame. The intra-frame prediction region can be indicated with a BV value. The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. For an inter-frame predicted block, the decoder (450) combines reconstructed prediction residual values with motion-compensated prediction values. The decoder (450) can similarly combine prediction residual values with prediction values from intra-frame prediction. An adaptive deblocking filter is included within the motion compensation loop in the video decoder (450) to smooth discontinuities across block boundary rows and/or columns in the decoded frame (451). Other filtering (such as de-ringing filtering, ALF, or SAO filtering; not shown) can alternatively or additionally be applied as in-loop filtering operations.

The decoded frame temporary memory storage area (460) includes multiple frame buffer storage areas (461, 462, ..., 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) identifies when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders.

Figure 5A:
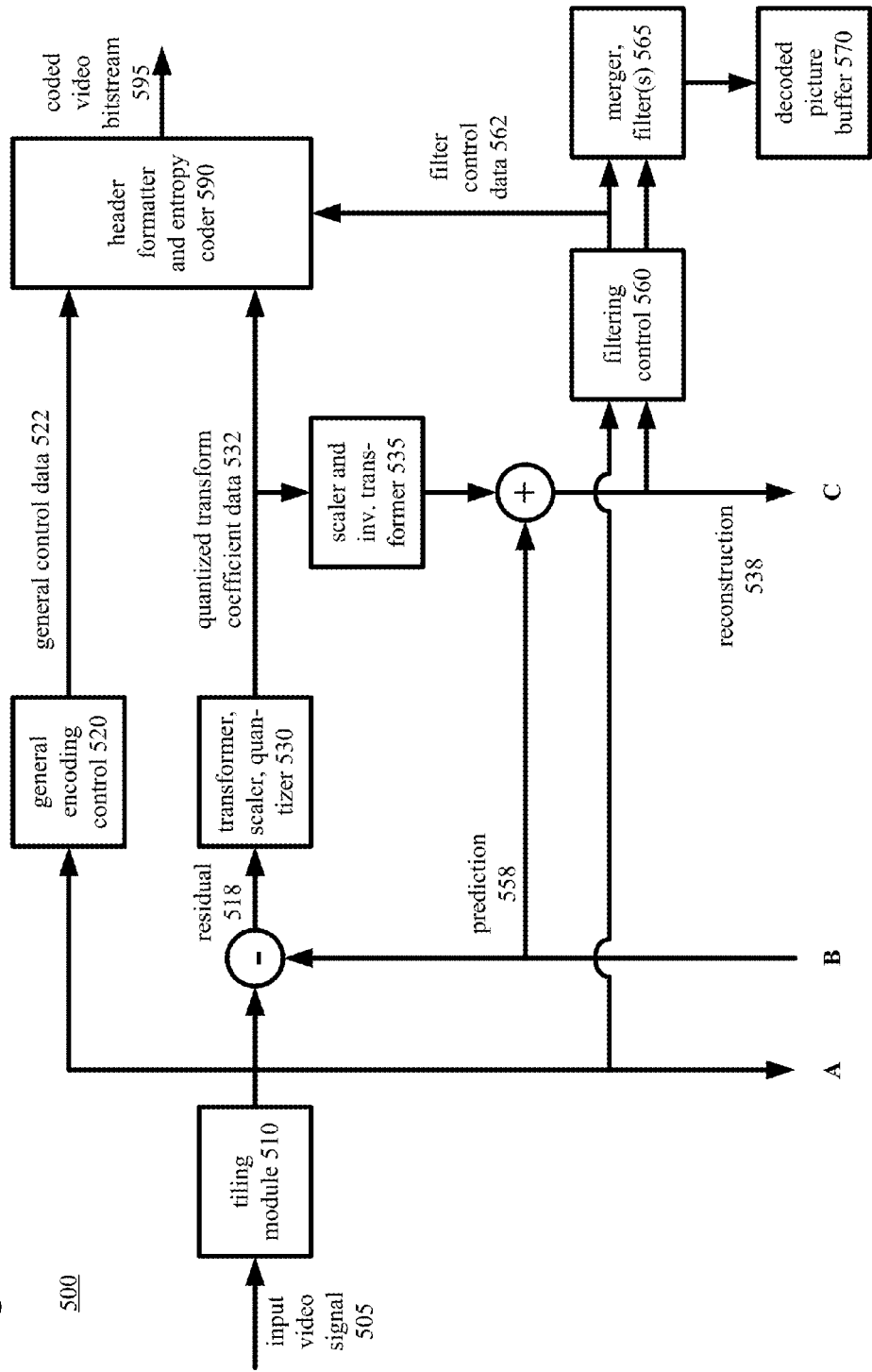
FIGS. 5a and 5b are diagrams illustrating an example video encoder in conjunction with which some described embodiments can be implemented.
Figure 5B:
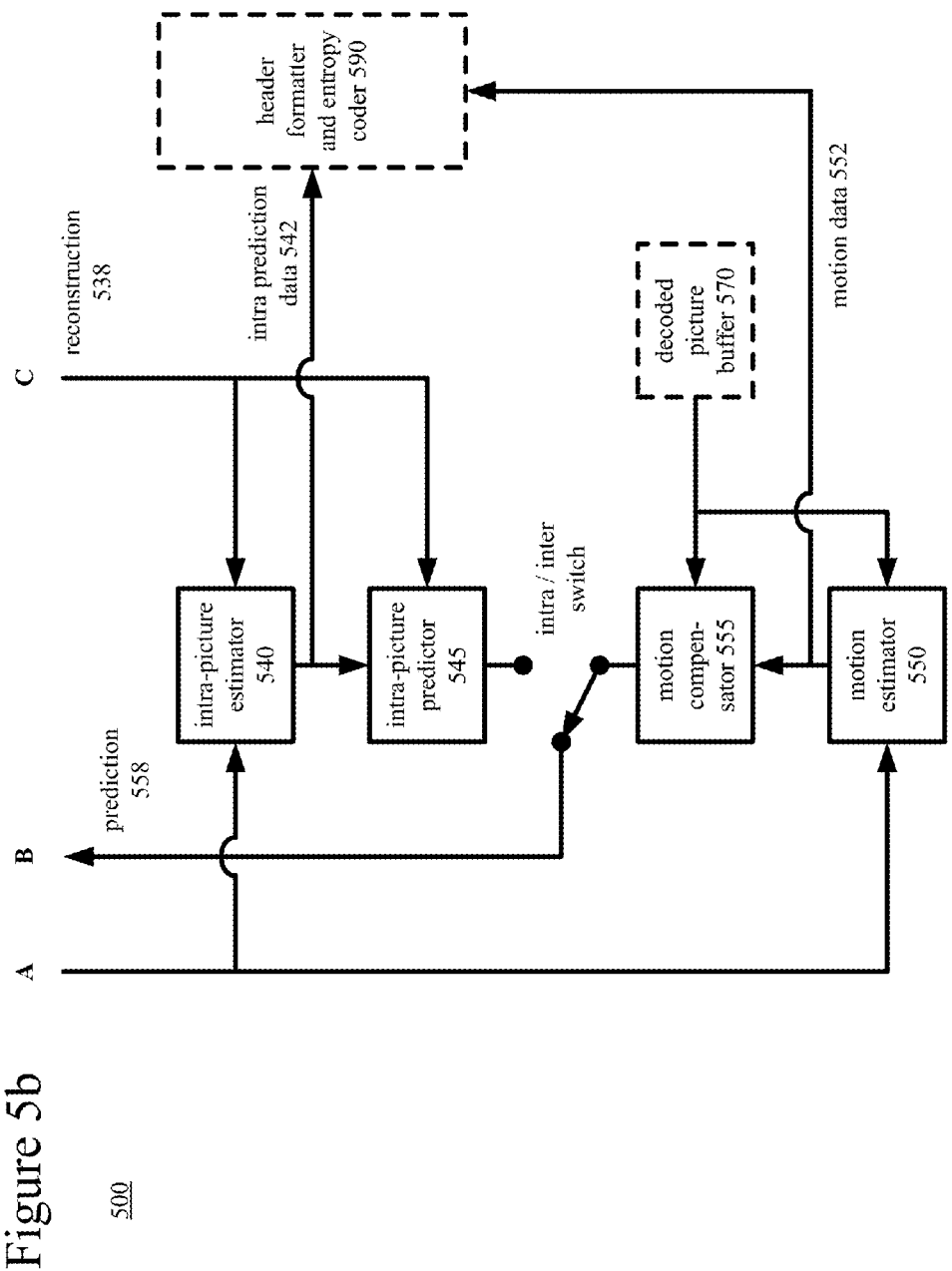

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use intra BC prediction during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of the current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values and reference picture selection data. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture. Or, for intra BC prediction using BV values, the intra-picture estimator (540) estimates displacement of the sample values of the current block to different candidate regions within the current picture. BV values can be predicted using a ping-pong approach to BV prediction, as described below. For intra BC prediction, the intra-prediction estimator (540) can constrain the BV selection process using one or more constraints described below, and it can estimate reconstructed sample values in an overlap area of a current block for purposes of BV estimation.

The intra-picture estimator (540) produces as side information intra prediction data (542), such as information indicating whether intra prediction uses spatial prediction or intra BC prediction (e.g., a flag value per intra block), prediction mode direction (for intra spatial prediction), and BV values (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of the current block using previously reconstructed sample values of an intra-prediction region, which is indicated by a BV value for the current block. When the chroma data for a picture has the same resolution as the luma data (e.g. when the format is YUV 4:4:4 format or RGB 4:4:4 format), the BV value that is applied for the chroma block may be the same as the BV value applied for the luma block. On the other hand, when the chroma data for a picture has reduced resolution relative to the luma data (e.g. when the format is YUV 4:2:0 format or YUV 4:2:2 format), the BV value that is applied for the chroma block may be scaled down and possibly rounded to adjust for the difference in chroma resolution (e.g., for YUV 4:2:0 format, by dividing the vertical and horizontal components of the BV value by two and truncating or rounding them to integer values; for YUV 4:2:2 format, by dividing the horizontal component of the BV value by two and truncating or rounding it to an integer value).

The intra/inter switch selects values of a motion-compensated prediction or intra-picture prediction for use as the prediction (558) for a given block. The difference (if any) between a block of the prediction (558) and a corresponding part of the original current picture of the input video signal (505) provides values of the residual (518). During reconstruction of the current picture, reconstructed residual values are combined with the prediction (558) to produce a reconstruction (538) of the original content from the video signal (505). In lossy compression, however, some information is still lost from the video signal (505).

In the transformer/scaler/quantizer (530), a frequency transformer converts spatial-domain video data into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies dead-zone scalar quantization to the frequency-domain data with a quantization step size that varies on a frame-by-frame basis, tile-by-tile basis, slice-by-slice basis, block-by-block basis, frequency-specific basis or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks of reconstructed prediction residual values or sample values. The encoder (500) combines reconstructed residual values with values of the prediction (558) (e.g., motion-compensated prediction values, intra-picture prediction values) to form the reconstruction (538).

For intra-picture prediction, the values of the reconstruction (538) can be fed back to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). For example, the header formatter/entropy coder (590) uses context-adaptive binary arithmetic coding for entropy coding of various syntax elements such as syntax elements for BV values. The header formatter/entropy coder (590) can use a ping-pong approach to BV prediction, as described below, when encoding BV values.

The header formatter/entropy coder (590) provides the encoded data in the coded video bitstream (595). The format of the coded video bitstream (595) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders.

Figure 6:
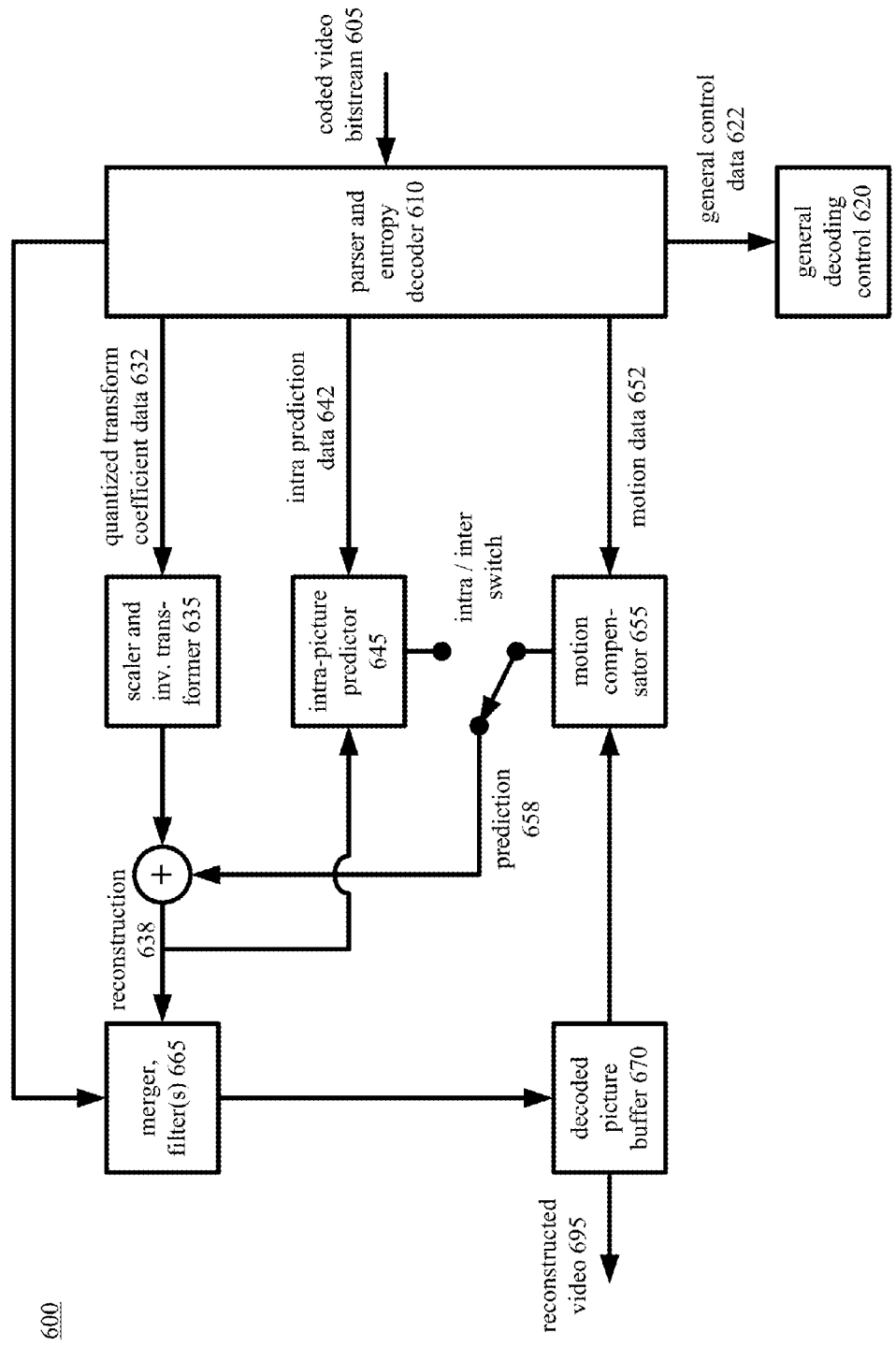
FIG. 6 is a diagram illustrating an example video decoder in conjunction with which some described embodiments can be implemented.

FIG. 6 is a block diagram of a generalized decoder (600) in conjunction with which some described embodiments can be implemented. The decoder (600) receives encoded data in a coded video bitstream (605) and produces output including pictures for reconstructed video (695). The format of the coded video bitstream (605) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bit-stream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). In particular, for the intra prediction data (642), the parser/entropy decoder (610) entropy decodes syntax elements for BV values, e.g., using context-adaptive binary arithmetic decoding. The parser/entropy decoder (610) can use a ping-pong approach to BV prediction, as described below, when decoding BV values.

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as MV data, reference picture selection data and merge mode index values. The motion compensator (655) applies MVs to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-frame prediction predictor (645) receives the intra prediction data (642), such as information indicating whether intra prediction uses spatial prediction or intra BC prediction (e.g., a flag value per intra block), prediction mode direction (for intra spatial prediction) and BV values (for intra BC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction using BV values, the intra-picture predictor (645) predicts the sample values of the current block using previously reconstructed sample values of an intra-prediction region, which is indicated by a BV value for the current block.

The intra/inter switch selects values of a motion-compensated prediction or intra-picture prediction for use as the prediction (658) for a given block. For example, when HEVC syntax is followed, the intra/inter switch can be controlled based on a syntax element encoded for a CU of a picture that can contain intra-predicted CUs and inter-predicted CUs. The decoder (600) combines the prediction (658) with reconstructed residual values to produce the reconstruction (638) of the content from the video signal.

To reconstruct the residual, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof).

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing filter. The post-processing filter can include de-ringing filtering, adaptive Wiener filtering, film-grain reproduction filtering, SAO filtering or another kind of filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Intra Block Copy Prediction Mode.

This section presents various features of intra block copy ("BC") prediction mode. Some of the features relate to selection of block vector ("BV") values, while others relate to encoding/decoding of BV values. These features can facilitate intra BC prediction that is more effective in terms of rate-distortion performance and/or computational efficiency of encoding and decoding. In particular, intra BC prediction can improve rate-distortion performance when encoding certain "artificially" created video content such as screen-capture content. Screen-capture content typically includes repeated structures (e.g., graphics, text characters), which provide opportunities for intra BC prediction to improve performance. Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0, YUV 4:2:2).

A. Intra BC Prediction Mode—Introduction.

For intra BC prediction mode, the sample values of a current block of a picture are predicted using sample values in the same picture. A BV indicates a displacement from the current block to a region of the picture that includes the sample values used for prediction. Typically, the sample values used for prediction are previously reconstructed sample values. The BV is signaled in the bitstream. Intra BC prediction is a form of intra-picture prediction—intra BC prediction for a block of a picture does not use any sample values other than sample values in the same picture.

Figure 7:
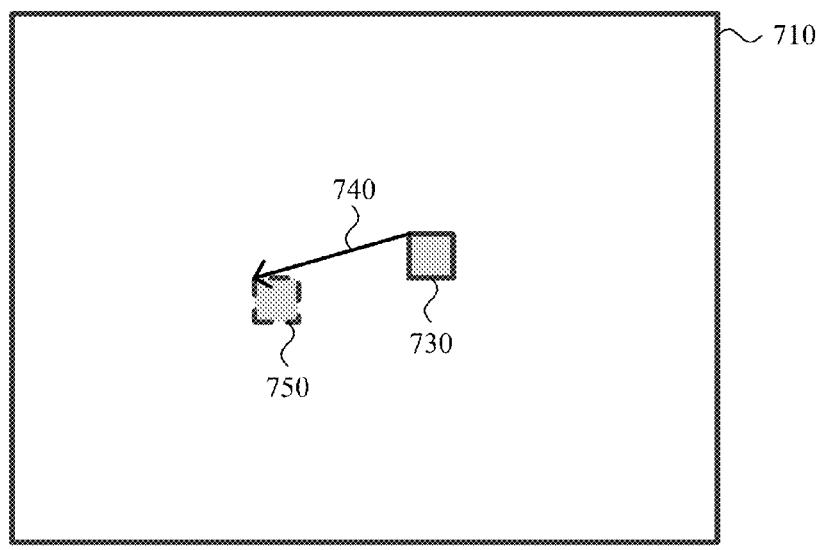
FIG. 7 is diagram illustrating intra BC prediction for a block of a picture.

FIG. 7 illustrates intra BC prediction for a current block (730) of a current frame (710). The current block can be a coding block ("CB") of a coding unit ("CU"), prediction block ("PB") of a prediction unit ("PU"), transform block ("TB") of a transform unit ("TU") or other block. The size of the current block can be 64×64, 32×32, 16×16, 8×8 or some other size. More generally, the size of the current block is m×n, where each of m and n is a whole number, and where m and n can be equal to each other or can have different values. Alternatively, the current block can have some other shape (e.g., an area of a coded video object with a non-rectangular shape).

The BV (740) indicates a displacement (or offset) from the current block (730) to a region (750) of the picture that includes the sample values used for prediction. Suppose the top left position of a current block is at position $(x_0, y_0)$ in the current frame, and suppose the top left position of the intra-prediction region is at position $(x_1, y_1)$ in the current frame. The BV indicates the displacement $(x_1-x_0, y_1-y_0)$. For example, if the top left position of the current block is at position (320, 256), and the top left position of the intra-prediction region is at position (295, 270), the BV value is (−25, 14). In this example, a negative horizontal displacement indicates a position to the left of the current block, and a negative vertical displacement indicates a position above the current block.

In some example implementations, the intra-predicted region (750) is constrained to be within the same slice and tile as the current block (730). Such intra BC prediction does not use sample values in other slices or tiles. The location of the intra-predicted region (750) may be subject to one or more other constraints (e.g., for search range, regarding use of reconstructed sample values of inter-coded blocks).

A block with prediction mode of intra BC prediction can be a CB, PB or other block. When the block is a CB, the BV for the block can be signaled at CU level (and other CBs in the CU use the same BV or a scaled version thereof). Or, when the block is a PB, the BV for the block can be signaled at PU level (and other PBs in the PU use the same BV or a scaled version thereof). More generally, the BV for an intra-BC prediction block is signaled at an appropriate syntax level for the block.

The block copying operations of prediction according to the intra BC prediction mode can be performed at the level of CB (when a BV is signaled per CB) or PB (when a BV is signaled per PB). For example, suppose a 16×16 CB has a single 16×16 PB. The BV (for the PB) is applied to block copy a 16×16 region. When the intra-prediction region is constrained to not overlap the 16×16 block being predicted, the BV has a magnitude (absolute value) of at least 16 horizontally or vertically.

Alternatively, the block copying operations can be performed at the level of TBs within a PB or CB, even when the BV is signaled for the PB or CB. In this way, a BV, as applied for a TB, can reference positions of other TBs in the same PB or CB. For example, suppose a 16×16 CB has a single 16×16 PB but is split into sixteen 4×4 TBs for purposes of residual coding/decoding. The BV (for the PB) is applied to block copy a 4×4 region for the first TB in raster scan order, then the same BV is applied to block copy a 4×4 region for the second TB in raster scan order, and so on. The 4×4 region used in the BC operations for a TB can include positions in previously reconstructed TBs in the same CB, after combining residual values with predicted values for those previously reconstructed TBs. (A BV still does not reference positions in the same TB that is being predicted). Applying BC operations at the TB level facilitates use of BVs with relatively small magnitudes.

Intra BC prediction operations for chroma blocks of a CU generally correspond to intra BC prediction operations for the luma block of the CU. Normally, the segmentation of chroma PBs and chroma TBs corresponds directly to the segmentation of the luma PBs and luma TBs in the CU. When the format of video is YUV 4:4:4, the sizes of chroma PBs and TBs match the sizes of corresponding luma PBs and TBs. When the format of video is YUV 4:2:0, chroma PBs and TBs are half the width and half the height of corresponding luma PBs and TBs. If a luma TB has minimum transform size, however, a single chroma TB having that minimum transform size is used. When the format of video is YUV 4:2:2, chroma PBs and TBs are half the width of corresponding luma PBs and TBs.

In some implementations, for an intra BC predicted CU, intra BC prediction for a chroma block in a PU uses the same BV value as intra BC prediction for the luma block in the PU, possibly after scaling and rounding when the chroma data has reduced resolution relative to the luma data (e.g. when the format is YUV 4:2:0 format or YUV 4:2:2 format). Alternatively, different BV values can be signaled for the luma block and chroma blocks of a PU.

In some implementations, if the prediction mode of the luma block of a PU is intra BC prediction, the prediction mode for the chroma blocks of the PU is also intra BC predicted. For example, the prediction mode is signaled for the PU. Alternatively, the prediction mode can be intra BC prediction for the luma block or chroma blocks of the PU, but not both.

B. Constraining BV Search for Intra BC Prediction Mode.

In some example implementations, an encoder limits BV range according to one or more constraints. By limiting BV range, the area of reconstructed sample values that is referenced by fast memory access for intra BC prediction during encoding and decoding can be reduced, which tends to lower implementation cost.

Figure 8:
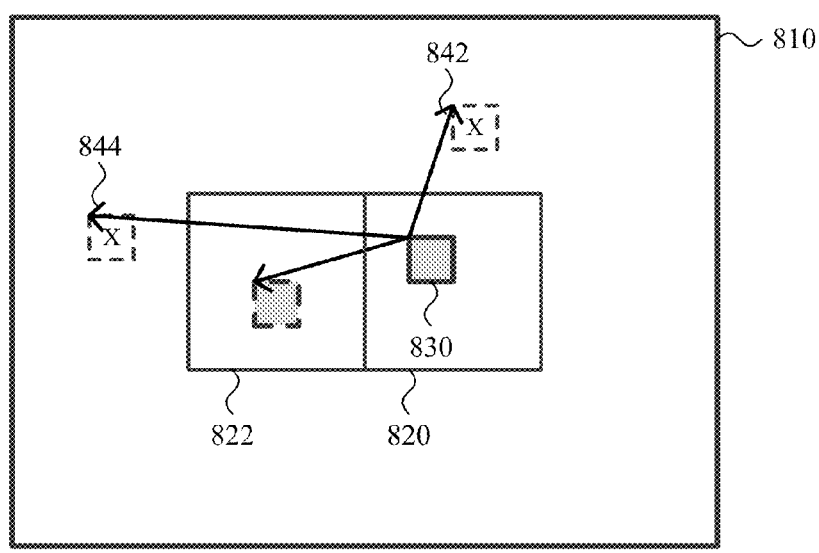
FIG. 8 is a diagram illustrating example constraints on search range for BV values.

FIG. 8 illustrates example constraints on search range for BV values. In addition to a current block (830) of a current frame (810), FIG. 8 shows a search range defined by two CTBs (820, 822). The current CTB (820) is part of the current CTU and includes the current block (830). With the CTB (822) to its left, the current CTB (820) defines a search range within which allowable BVs can be found for the current block (830). BVs (842, 844) reference regions that are outside the search range, so those BV values (842, 844) are not allowed.

In some example implementations, the search range for BV values for a current block is the current CTB and the CTB to its left. For example, a CTB can have size of 64×64, 32×32 or 16×16 sample values, which yields a search range of 128×64, 64×32 or 32×16 sample values. Only sample value in the current CTB and left CTB are used for intra BC prediction for the current block. This simplifies encoder implementation by constraining the search process. It also simplifies decoder implementation by limiting the number of sample values that the decoder buffers in fast memory for intra prediction. Another constraint is that intra prediction cannot reference sample values from another slice or tile. For a current m×n block with a top left position at $(x_0, y_0)$ and CTB(s) each having dimensions $CTB_{sizeY} \times CTB_{sizeY}$, an encoder can check these constraints for a two-dimensional BV having a horizontal component BV[0] and vertical component BV[1] as follows.

$$BV[0] \geq -((x_0 \% \ CTB_{sizeY}) + CTB_{sizeY})$$

$$BV[1] \geq -(y_0 \% \ CTB_{sizeY})$$

The sample values at positions $(x_0, y_0)$, $(x_0+BV[0], y_0+BV[1])$ and $(x_0+BV[0]+m-1, y_0+BV[1]+n-1)$ shall be in the same slice.

The sample values at positions $(x_0, y_0)$, $(x_0+BV[0], y_0+BV[1])$ and $(x_0+BV[0]+m-1, y_0+BV[1]+n-1)$ shall be in the same tile.

Figure 9:
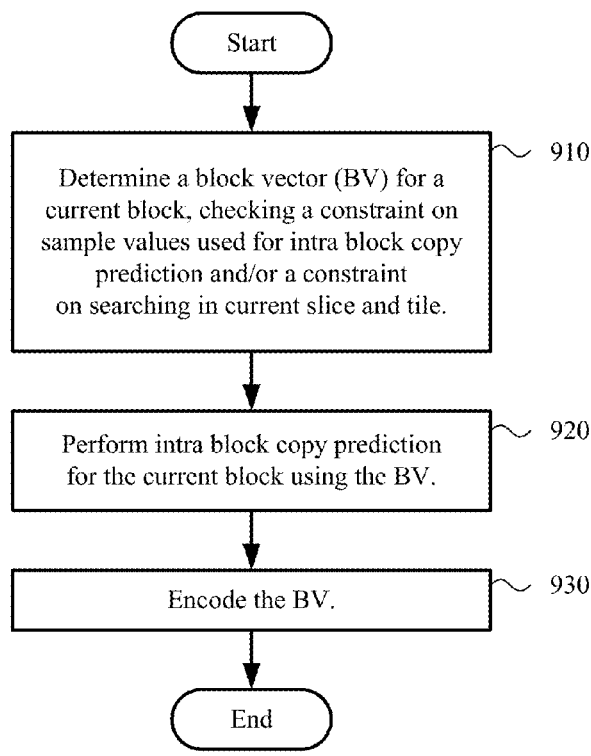
FIG. 9 is a flowchart illustrating a generalized technique for encoding with an intra BC prediction mode, subject to one or more constraints on selection of BV values.

FIG. 9 shows a technique (900) for encoding with an intra BC prediction mode, subject to one or more constraints on selection of BV values. An encoder such as one described with reference to FIG. 3 or FIGS. 5a-5b can perform the technique (900).

To start, the encoder determines (910) a BV for a current block of a picture. The current block can be a CB, PB or other block. The BV indicates a displacement to a region within the picture. In determining the BV, the encoder checks one or more constraints.

According to one possible constraint, the encoder checks range of sample values used for intra BC prediction. The encoder can check that a candidate intra-prediction region is within a range defined by a current CTB and one or more other CTBs (e.g., CTB to the left of the current CTB). For example, when the BV has a first component BV[0] and a second component BV[1], the current block has a top left position at position $(x_0, y_0)$, and each of the CTB(s) has width $CTB_{width}$ and height $CTB_{height}$, the constraint is satisfied if $BV[0] \geq -((x_0 \% \ CTB_{width}) + CTB_{width})$ and $BV[1] \geq -(y_0 \% \ CTB_{height})$. The encoder can similarly check upper limits on values of BV[0] and BV[1] within the search range: $BV[0] < (CTB_{width} - m - (x0 \% \ CTB_{width}))$ and $BV[1] < (CTB_{height} - n - (y0 \% \ CTB_{height}))$. Alternatively, the search range includes more or fewer CTBs, or the search range is defined in some other way.

According to another possible constraint, the encoder limits searching to the current slice and tile (i.e., the current block and region are part of no more than one slice of the picture and no more than one tile of the picture). The encoder can check that a top left position of the current block, a top left position of a candidate intra-prediction region and a bottom right position of the candidate intra-prediction region are part of a single slice and single tile. For example, the constraint is satisfied if $(x_0, y_0)$, $(x_0+BV[0], y_0+BV[1])$ and $(x_0+BV[0]+m-1, y_0+BV[1]+n-1)$ are part of a single slice and single tile.

Alternatively, the encoder checks other and/or additional constraints.

The encoder performs (920) intra BC prediction for the current block using the BV. For example, the encoder performs intra BC prediction for the entire current block. Or, the encoder performs intra BC prediction for multiple blocks associated with the current block (e.g., for multiple TBs on a TB-by-TB basis, where the TBs are associated with a current PB that has the BV).

The encoder encodes (930) the BV. For example, the encoder encodes (930) the BV as described below. The encoder can repeat the technique (900) for another intra BC prediction mode block.

For intra BC prediction, the encoder and decoder use reconstructed sample values. Unreconstructed sample values might be present as parts of a picture that have not been encoded and reconstructed yet. To avoid using unreconstructed sample values for intra BC prediction, the encoder can set constraints on allowable values of BV such that only actual, previously reconstructed sample values are used for intra BC prediction according to a BV.

In some example implementations, the encoder checks a BV value by considering the z-scan orders of the current block and the block that contains the bottom right position of the candidate intra-prediction region. More specifically, the encoder checks that the z-scan order of the block containing the position $(x_0+BV[0]+m-1, y_0+BV[1]+n-1)$ is smaller than z-scan order of the block containing $(x_0, y_0)$. If so, the block that contains the bottom right position of the intra-prediction region has been previously reconstructed (and hence so has the rest of the intra-prediction region). The BV also satisfies at least one of the conditions $BV[0]+m \leq 0$ and $BV[1]+n \leq 0$, ensuring that the intra-prediction region does not overlap the current block.

Figure 10:
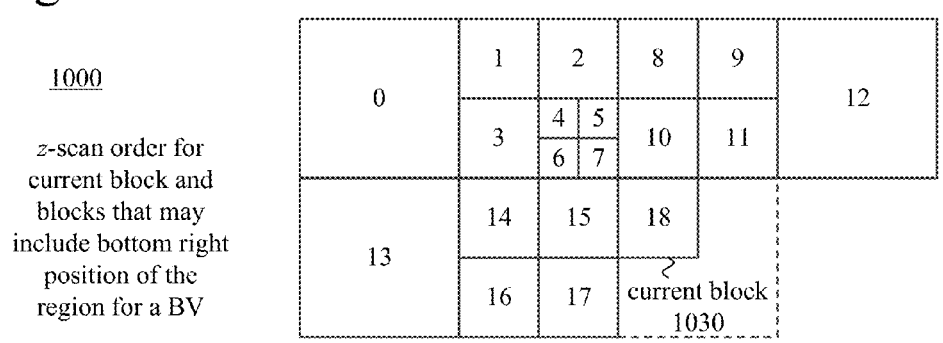
FIG. 10 is a diagram illustrating example z-scan order for blocks of a picture.

The z-scan order follows a sequentially specified ordering of blocks that partition a picture. FIG. 10 shows example z-scan order (1000) for a current block (1030) and blocks that might include the bottom right position of an intra-prediction region for a candidate BV. The current block (1030) can be a CB, PB or other block. The z-scan orders are generally assigned to blocks sequentially from left-to-right in a row, repeating in successive rows from top-to-bottom. When a block is split, z-scan orders are assigned within the split block, recursively. For implementations of encoding/decoding for the HEVC standard, the z-scan order proceeds CTB-to-CTB by a CTB raster scan pattern (left-to-right in a CTB row, repeating in successive CTB rows from top-to-bottom). If a CTB is split, the z-scan order follows a raster scan pattern for CBs of a quadtree within the split CTB. And, if a CB is split (e.g., into multiple CBs, or into multiple PBs), the z-scan order follows a raster scan pattern for blocks within the split CB.

Alternatively, when intra BC prediction can be performed on a TB-by-TB basis, the encoder and decoder can check for possible overlap between an intra-prediction region and a current block (TB), then use the results of the check to decide whether the current TB should be split into smaller TBs for application of intra BC prediction operations. Suppose a current TB has a size of m×n, where m and n can be equal to each other or can have different values. If $BV[0] > -m$ and $BV[1] > -n$, the intra-prediction region overlaps the current m×n TB, which is problematic unless the current m×n TB is split into smaller TBs for application of intra BC prediction operations. Thus, if $BV[0] > -m$ and $BV[1] > -n$, the encoder and decoder split the current TB into smaller TBs. The same condition is checked (e.g., checked recursively) for the smaller TBs, which may be further split if $BV[0] > -m$ and $BV[1] > -n$ even for the smaller values of m and n after splitting.

For example, suppose the BV for a PB is (−9, −5), and the current TB is a 32×32 block. The encoder and decoder determine that −9>−32 and −5>−32, indicating that the intra-prediction region (whose top left corner is displaced −9, −5) would overlap the current 32×32 TB. The encoder and decoder split the 32×32 TB into four 16×16 TBs. For each of the 16×16 TBs, the encoder and decoder determine that −9>−16 and −5>−16, indicating that the intra-prediction region (whose top left corner is displaced −9, −5) would overlap the current 16×16 TB. The encoder and decoder split each 16×16 TB, in succession, into four 8×8 TBs. For an 8×8 TB, the BV of (−9, −5) is not problematic, so the 8×8 TB is not forced to be further split.

In this scenario, when a TB is split due to a BV value and size of the TB, the encoder can skip signaling of the flag value that would otherwise signal whether to split the current TB into smaller TBs. The bitstream of encoded data lacks the flag value directing the decoder to split the current TB into smaller TBs. Instead, the decoder can infer that a TB should be split due to a BV value and the size of the TB. This can save bits that would otherwise be spent signaling information about splitting TBs.

C. Encoding and Decoding of BV Values.

Collectively, BV values for blocks encoded using intra BC prediction can consume a significant number of bits. The BV values can be entropy encoded to reduce bit rate. To further reduce bit rate for BV values, an encoder can use prediction of the BV values. BV values often exhibit redundancy—the BV value for a given block is often similar to, or even the same as, the BV values of previous blocks in the picture. For BV prediction, the BV value for the given block is predicted using a BV predictor. The difference (or BV differential) between the BV value for the given block and the BV predictor is then entropy coded. Typically, the BV differential is computed for horizontal and vertical components of the BV value and BV predictor. When BV prediction works well, BV differentials have a probability distribution that supports efficient entropy coding. An encoder and decoder can use basic BV prediction and/or merge mode/BV competition when encoding/decoding BV values.

For basic BV prediction during encoding and decoding, the BV value for a current block can be predicted based on the BV values of one or more previous blocks. For example, the BV value of a neighboring block (e.g., block left of the current block) can be used to determine a BV predictor for the BV value of the current block. If the BV value of the current block is (−80, −24) and the BV predictor is (−80, −32), the BV differential of (0, 8) is entropy encoded. Or, the BV predictor for the BV value of the current block can be the component-wise median or average of the BV values of multiple neighboring blocks (e.g., blocks to the left, above and above-left of the current block).

During decoding, a decoder receives and entropy decodes the entropy coded BV differential, if any, for a BV value. The decoder also determines a BV predictor for the BV value. (The BV predictor determined by the decoder is the same as the BV predictor determined by the encoder.) The reconstructed BV difference, if any, is then combined with the BV predictor.

The encoder and decoder can use a default BV predictor when an actual BV value from a previous block is not available (e.g., when determining a BV value for the first intra BC-predicted block in a given CTU). For example, the default BV predictor can be (0, 0). Or, the default BV predictor can be (−W, 0) or (−2*W, 0), where W is the width of the current block. Or, the default BV predictor can be (0, −H) or (0, −2*H), where H is the height of the current block. Compared to a zero-value default BV predictor, a default BV predictor with a non-zero component tends to be closer to the BV value of the current block, which results more efficient entropy coding of the BV differential. Or, a component of the default BV predictor can have a fixed non-zero value (e.g., 8 or 16).

In any case, when the BV value that is possible for the current block is constrained to fall within a specific search range (e.g., the current CTB and CTB to the left of the current CTB, as described in the previous section), and BV values cannot result in overlap between a current block and its intra-prediction region, in some cases the BV value for the current block can only have one possible value. For example, if (1) the current CTB has a single CB as the current block, (2) the search range for BV values is the current CTB and CTB to its left, and (3) overlapping between the current block and its intra-prediction region is not allowed, then the BV value for the single CB must have the BV value of (−W, 0). Other BV values either reference locations outside the search range or reference locations within the current block. In this situation, the encoder can skip signaling of the BV value (or BV differential) for the current block. The decoder can check conditions to identify the situation and infer the BV value of (−W, 0) without parsing and decoding any BV value (or BV differential) for the current block.

Or, an encoder and decoder determine one or more candidate BV values for a current block among the BV values used for reconstructed blocks that spatially neighbor the current block (e.g., block to the left of the current block, block above the current block, and so on). The candidate BV value(s) can also include one or more BV values used for reconstructed blocks that temporally neighbor the current block, where a temporally neighboring block is at a corresponding position as the current block in another picture (e.g., same position or overlapping position). The list of candidate BV value(s) can be determined by rules during encoding and decoding to eliminate redundant BV values. During encoding, the encoder can signal one or more syntax elements indicating which of the candidate BV value(s) to use as the BV predictor for the current block. In some modes, that BV predictor can be used as the BV value for the current block, which effectively "merges" the BV value of the current block with the BV value the neighbor providing the candidate BV value. Or, the encoder can determine and encode a BV difference based on the BV value and BV predictor. During decoding, the decoder can receive one or more syntax elements indicating which of the candidate BV value(s) to use as the BV predictor for the current block. In some modes, that BV predictor can be used as the BV value for the current block, which effectively "merges" the BV value of the current block with the BV value the neighbor providing the candidate BV value. Or, the decoder can receive and decode a BV difference, which the decoder combines with the BV predictor to reconstruct the BV value. A BV "skip" or BV "direct" mode can be provided in which the BV predictor (selected by rule) is used as the BV value of the current block, with no residual values signaled for the current block. Examples of BV prediction using a ping-pong approach, in which an encoder or decoder selects between a pair of candidate BV values when predicting the BV value for a block, are described below.

D. Example Implementation Combining Features of Intra BC Prediction.

As noted, the preceding features of intra BC prediction can be used separately and individually. Or, the preceding features of intra BC prediction can be used can be used in combination.

For example, in one combined implementation that generally follows HEVC syntax, a BV value is signaled for a PU (which can be a CU, or part of a CU). The PU can include one or more TUs. Intra BC prediction processes operate at the level of TBs, on a TB-by-TB basis, using the BV value signaled for the PU. (All TBs use the same BV value, and intra BC prediction for a current TB can use reconstructed sample values of other, earlier TBs in the same CU). The BV value can be predicted using the BV values of one or more neighboring PUs (e.g., using a ping-pong approach to BV prediction). The selection of BV values is constrained: (a) such that the encoder is prohibited from selecting BV values that would cause any sample values to be referenced that lie within areas that have not yet been encoded/reconstructed (i.e., the sample values of an intra-prediction region for a current TB must be in areas covered by other TBs that precede the current TB in decoding/bitstream order; that is, for a given TB, the BV value is constrained to reference a region that is outside of the TB); (b) to reduce the necessary memory capacity in the decoder (e.g., by constraining references according to BV values to be within the current CTB and one or two CTBs to the left of the current CTB); and (c) to prohibit references according to BV values from being outside the current slice, outside the current tile or outside the picture.

VIII. Innovations in Block Vector Prediction.

According to one aspect of the innovations described herein, an encoder and decoder use block vector ("BV") prediction according to a "ping-pong" approach. In particular, example ping-pong approaches to BV prediction improve coding efficiency when encoding screen content video in some scenarios.

In the example ping-pong approaches, the encoder and decoder maintain a pair of candidate BV values as state information. FIG. 11 shows a pair of candidate BV values in BV buffers (1100) that can be used in the example ping-pong approaches. In the BV buffers (1100), BV buffer 0 stores a first initial candidate BV value, which is labeled $BV_{init\_0}$. BV buffer 1 stores a second initial candidate BV value, which is labeled $BV_{init\_1}$. In general, the BV value variable for BV buffer 0 can be labeled PBV0, and the BV value variable for BV buffer 1 can be labeled PBV1.

FIG. 12 shows another data structure (1200) that can store a pair of candidate BV values according to the example ping-pong approaches. The data structure (1200) stores a first initial candidate BV value, which is labeled $BV_{init\_0}$ and is associated with the index value idx0. A second initial candidate BV value ($BV_{init\_1}$) is associated with the index value idx1 in the data structure (1200). In general, the BV value variable associated with idx0 can be labeled PBV0, and the BV value variable associated with idx1 can be labeled PBV1.

Alternatively, the encoder and decoder use another data structure to track a pair of candidate BV values for BV prediction according to a ping-pong approach.

According to the example ping-pong approaches, from a pair of candidate BV values, an encoder selects the BV predictor to use for a BV value of a PU. For example, when the PU will be encoded using intra BC prediction with the selected candidate BV value, the encoder selects the candidate BV value for which the referenced intra-prediction region most closely matches the PU by some metric (e.g., sum of absolute difference, mean squared error). Or, when the PU has a BV value (identified through BV estimation) that will be used for intra BC prediction, the encoder selects the candidate BV value that most closely matches the BV value for the PU. This selection results in the smallest BV differentials, which tends to improve the efficiency of entropy coding.

For a BV value, the encoder signals a flag value that indicates the selected one of the pair of candidate BV values, so as to indicate to a decoder which of the pair of candidate BV values should be used as the BV predictor. The flag value can be entropy coded or signaled as a fixed-length value. The flag value can be (conditionally) signaled in the bitstream as a separate syntax element, or the flag value can be signaled in the bitstream jointly with another syntax element.

When each candidate BV value in the pair of candidate BV values is equally likely to be the BV predictor, the flag value can efficiently be signaled as a fixed-length value (e.g., 1 bit), or using binary arithmetic coding in bypass mode (assuming the two possible values are equally probable). A first value (e.g., 0) indicates selection of the first candidate BV value, and a second value (e.g., 1) indicates selection of the second candidate BV value. The flag value can also be signaled as a fixed-length value when one of the pair of candidate BV values is more likely than the other, but coding efficiency may be reduced.

When one of the candidate BV values in the pair is more likely to be selected as BV predictor, it may be more efficient to use context-based arithmetic coding to signal flag values. For example, the probability content for the flag values can be initialized to equal probability for the two possible flag values when coding or decoding begins for a slice, then updated during coding/decoding to account for occurrences of the different flag values. Having a separate context for BV predictor flag values may improve coding efficiency, but adds to the complexity of encoding and decoding due to context modeling, etc. Typically, the candidate BV value that is expected to be selected more frequently is stored in a first BV buffer (e.g., BV buffer 0) and indicated with a first flag value, and the candidate BV value that is expected to be selected less frequently is stored in the other BV buffer (e.g., BV buffer 1) and indicated with the other flag value. Thus, flag values indicating the first BV buffer can, on average, be encoded using a smaller number of fractional bits in arithmetic coding. For some content, however, the more common candidate BV values may be stored in the other BV buffer (e.g., BV buffer 1), with the context modeling accounting for the change in BV predictor distribution.

A decoder parses/decodes the flag value for a BV value and uses the flag value to determine which of the pair of candidate BV values is the BV predictor for the BV value. The decoder uses the selected candidate BV value as the BV predictor.

The encoder and decoder track and update which BV values are in the pair of candidate BV values. In previous ping-pong approaches, when a new BV value is produced (or reconstructed), the older candidate BV value (PBV1) in the pair is replaced by the newer BV value (PBV0) in the pair, and the newer BV value (PBV0) in the pair is replaced by the just produced/reconstructed BV value ($BV_{new}$). (That is, PBV1=PBV0, and PBV0=$BV_{new}$.) The pair of candidate BV values is updated as each BV value is produced or reconstructed.

In example ping-pong approaches described herein, an encoder and decoder can automatically update the pair of candidate BV values to include a BV value after the BV value is produced or reconstructed. This can result in the pair of candidate BV values having two identical candidate BV values, however. In this situation, the encoder (recognizing that both candidate BV values are identical) can skip signaling of a flag value that indicates the selection between the pair of candidate BV values, and a decoder (recognizing that both candidate BV values are identical) can skip parsing of the flag value, instead simply using either of the identical candidate BV values as the BV predictor.

Or, in example ping-pong approaches described herein, the encoder and decoder can selectively update the pair of candidate BV values (and BV buffers) to avoid having identical candidate BV values. The encoder or decoder updates the pair of candidate BV values only when the new BV value does not equal the candidate BV value that will remain in the pair. If the new BV value equals the candidate BV value that will remain in the pair, the encoder or decoder skips the update operation. For example, the encoder or decoder selectively updates the pair of candidate BV values (PBV0 and PBV1) to include the new BV value $BV_{new}$ as follows.

```
if (BV_new != PBV0) {
    PBV1 = PBV0;
    PBV0 = BV_new;
} else {
    do nothing;
}
```

By testing the condition $BV_{new}$!=PBV0, the encoder and decoder avoid the situation where PBV0 equals PBV1, in which case the flag value indicating the BV predictor is wasted. On the other hand, checking the condition adds complexity to BV prediction, which might not be acceptable given resource requirements or justified by gain in coding efficiency.

For example, suppose PBV0 is (−12, 0) and PBV1 is (−16, 0). If $BV_{new}$ is (−17, 0), (−12, 0) replaces (−16, 0) for PBV1, and (−17, 0) replaces (−12, 0) for PBV0. The previous BV value (−16, 0) from PBV1 is discarded. On the other hand, if $BV_{new}$ is (−12, 0), PBV0 and PBV1 are unchanged, since $BV_{new}$ matches PBV0. If $BV_{new}$ matches PBV1 (both (−16, 0), in this example), the order of PBV0 and PBV1 is effectively switched—(−12, 0) replaces (−16, 0) for PBV1, and (−16, 0) (for $BV_{new}$) replaces (−12, 0) for PBV0.

In example ping-pong approaches described herein, for CUs that have four PUs, an encoder and decoder use a different pattern when updating the pair of candidate BV values used for BV prediction. Conceptually, the different pattern uses CU-level updating of the pair of candidate BV values, as opposed to PU-level updating. After BV prediction is finished for a CU, the pair of candidate BV values includes the BV values of the first two PUs of the CU—the BV value for PU1 in BV buffer 0, and the BV value for PU0 in BV buffer 1. In contrast, according to previous ping-pong approaches, after BV prediction is finished for CU, the pair of candidate BV values includes the BV values of the last two PUs of the CU, which could be PU3 and PU2.

Alternatively, the encoder and decoder can use a different pattern when updating the pair of candidate BV values used for BV prediction. If flag values are coded using fixed-length values, for example, the encoder and decoder can "toggle" (alternate) between updating two BV buffers with the BV value that was just produced or reconstructed. In this way, the encoder and decoder can use a single operation to replace the older candidate BV value (instead of shifting the newer candidate BV value to the spot of the older candidate BV value, then adding the new BV value to the previous spot of the newer candidate BV value), but the encoder and decoder need to track which BV buffer should be updated next. Also, toggling may hurt coding efficiency for flag values by interfering with context-adaptive binary arithmetic coding.

When no actual BV values are available for use as candidate BV values (e.g., before coding or decoding the first CU of a CTU), the pair of candidate BV values can be initialized to default values. For example, both of the candidate BV values are initialized to (−2W, 0), where W is the width of the CU. Or, one of the candidate BV values can be initialized to (−2W, 0), and the other candidate BV value can be initialized to (0, −2H), where H is the height of the CU (and may be the same as W). Or, a candidate BV value can be initialized to another value such as (−W, 0) or (0, −H). Or, for the sake of simplicity, instead of using a default value that depends on actual CU size, a candidate BV value can be initialized to a fixed value such as (−8, 0), (−16, 0), (0, −8) or (0, −16), or to a value signaled in the bitstream. This may be appropriate, for example, when CUs of size 8 or 16 are most common for intra BC prediction. In any case, after the start of BV prediction, actual BV values replace the default BV values in the pair of candidate BV values.

In all of the following examples, unless otherwise indicated, BV buffer 0 stores a "favored" candidate BV value, which is more likely to be selected than the other candidate BV value stored in BV buffer 1. Context-adaptive binary arithmetic coding can exploit the higher probability of the more common BV predictor flag value to improve coding efficiency for the flag values.

A. Example BV Prediction for 2N×2N PU of a 2N×2N CU.

FIG. 13 shows an example of BV prediction for a 2N×2N PU of a 2N×2N CU according to example ping-pong approaches. The 2N×2N CU includes a single 2N×2N PU (PU0) whose BV is predicted using a pair of candidate BV values.

In FIG. 13, BV buffer 0 initially stores a first initial candidate BV value $BV_{init\_0}$ (PBV0), and BV buffer 1 initially stores a second initial candidate BV value $BV_{init\_1}$ (PBV1). The BV value for the single 2N×2N PU (PU0) is predicted using either PBV0 or PBV1, as indicated by a flag value for the 2N×2N PU. The BV value for PU0 is processed using the selected BV predictor (e.g., during encoding or decoding).

The pair of candidate BV values is then updated as follows. PBV1 is replaced with PBV0, and PBV0 is replaced with the BV value for PU0. That is, PBV1=PBV0, and PBV0=BV PU0. In FIG. 13, BV buffer 1 is updated to store $BV_{init\_0}$, and BV buffer 0 is updated to store the BV value for PU0 ($BV_{PU0}$). Alternatively, as explained above, the encoder or decoder selectively updates the pair of candidate BV values (and BV buffers) depending on whether the new BV value $BV_{new}$ (here, the $BV_{PU0}$) equals PBV0.

B. EXAMPLE BV PREDICTION FOR N×N PUS OF A 2N×2N CU.

FIG. 14 shows an example of BV prediction for four N×N PUs of a 2N×2N CU according to example ping-pong approaches. The 2N×2N CU includes four N×N PUs (PU0, PU1, PU2 and PU3) whose BV values are predicted using a pair of candidate BV values, which is updated during the BV prediction process for the CU.

In FIG. 14, BV buffer 0 initially stores a first initial candidate BV value $BV_{init\_0}$ (PBV0), and BV buffer 1 initially stores a second initial candidate BV value $BV_{init\_1}$ (PBV1). The BV value for the first N×N PU (PU0) is predicted using either PBV0 or PBV1, as indicated by a flag value for PU0. The BV value for PU0 ($BV_{PU0}$) is processed using the selected BV predictor (e.g., during encoding or decoding).

The pair of candidate BV values is then updated by replacing PBV1 with PBV0, and by replacing PBV0 with the BV value for PU0. That is, PBV1=PBV0, and PBV0=$BV_{PU0}$. In FIG. 14, BV buffer 1 is updated to store $BV_{init\_0}$, and BV buffer 0 is updated to store $BV_{PU0}$. Alternatively, as explained above, the encoder or decoder selectively updates the pair of candidate BV values (and BV buffers) depending on whether the new BV value $BV_{new}$ (here, the $BV_{PU0}$) equals PBV0.

Next, the BV value for the second N×N PU (PU1) is predicted using either PBV0 (in FIG. 14, $BV_{PU0}$ of its left neighbor) or PBV1 (in FIG. 14, $BV_{init\_0}$), as indicated by a flag value for PU1. The BV value for PU1 ($BV_{PU1}$) is processed using the selected BV predictor (e.g., during encoding or decoding).

The pair of candidate BV values is then updated by replacing PBV1 with PBV0, and by replacing PBV0 with the BV value for PU1. That is, PBV1=PBV0, and PBV0=$BV_{PU1}$. In FIG. 14, BV buffer 1 is updated to store $BV_{PU0}$, and BV buffer 0 is updated to store $BV_{PU1}$. Alternatively, as explained above, the encoder or decoder selectively updates the pair of candidate BV values (and BV buffers) depending on whether the new BV value $BV_{new}$ (here, the $BV_{PU1}$) equals PBV0.

Next, the BV value for the third N×N PU (PU2) is predicted using either PBV0 (in FIG. 14, $BV_{PU1}$ of its top-right neighbor) or PBV1 (in FIG. 14, $BV_{PU0}$ of its top neighbor), as indicated by a flag value for PU2. For this flag value, BV buffer 1 stores the favored candidate BV value, not BV buffer 0. This adjustment accounts for $BV_{PU0}$ (top neighbor) being a more likely candidate than $BV_{PU1}$ (top-right neighbor). The BV value for PU2 ($BV_{PU2}$) is processed using the selected BV predictor (e.g., during encoding or decoding). Afterwards, the candidate BV values in BV buffer 0 (in FIG. 14, $BV_{PU1}$) and BV buffer 1 (in FIG. 14, $BV_{PU0}$) are unchanged.

Finally, the BV value for the fourth N×N PU (PU3) is predicted using either the BV value for PU2 ($BV_{PU2}$), which is buffered in another location, or PBV1 (in FIG. 14, $BV_{PU1}$ of its top neighbor), as indicated by a flag value for PU3. For this flag value, BV buffer 0 again stores the favored candidate BV value, although the other candidate BV value is not stored in BV buffer 1. The BV value for PU3 ($BV_{PU3}$) is processed using the selected BV predictor (e.g., during encoding or decoding). Afterwards, the candidate BV values in BV buffer 0 and BV buffer 1 are unchanged. In FIG. 14, at the end of BV prediction for the four N×N PUs of the CU, the pair of candidate BV values is $BV_{PU1}$ (in BV buffer 0) and $BV_{PU0}$ (in BV buffer 1).

In contrast, according to previous ping-pong approaches, for BV prediction for N×N PUs of a 2N×2N CU, when a BV value is produced or reconstructed, the candidate BV value in BV buffer 0 is moved to BV buffer 1, and the just produced/reconstructed BV value is stored in BV buffer 0. At the end of BV prediction for four N×N PUs of a 2N×2N CU, the pair of candidate BV values would be $BV_{PU3}$ (in BV buffer 0) and $BV_{PU2}$ (in BV buffer 1). There are several disadvantages to the previous ping-pong approaches, in practice. If the next CU has a single 2N×2N PU, $BV_{PU0}$ of the current CU usually would be the best BV predictor, but $BV_{PU0}$ of the current CU is not retained as one of the candidate BV values. Or, if the next CU has two N×2N PUs, $BV_{PU0}$ and $BV_{PU1}$ of the current CU usually would be the best BV predictors for PU0 and PU1 of the next CU, respectively, but $BV_{PU0}$ and $BV_{PU1}$ of the current CU are not retained as the candidate BV values.

According to the example ping-pong approaches described herein, however, after BV prediction for N×N PUs of a 2N×2N CU (as shown in FIG. 14), the pair of candidate BV values is $BV_{PU1}$ (in BV buffer 0) and $BV_{PU0}$ (in BV buffer 1). This retains the candidate BV values that are likely to be most useful for BV prediction for the next CU.

C. Example BV Prediction for N×2N PUs or 2N×N PUs of a 2N×2N CU.

Figure 15:
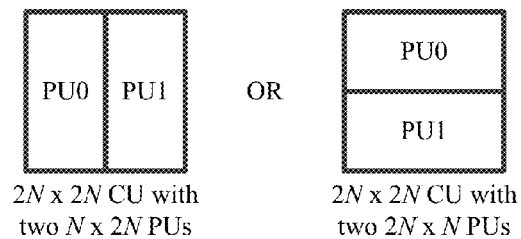
FIG. 15 is a diagram illustrating examples of BV prediction for N×2N PUs or 2N×N PUs of a 2N×2N CU according to example ping-pong approaches.

FIG. 15 shows an example of BV prediction for two N×2N PUs or two 2N×N PUs of a 2N×2N CU according to example ping-pong approaches. The 2N×2N CU includes two N×2N PUs (left PU0 and right PU1) or two 2N×N PUs (top PU0 and bottom PU1), whose BV values are predicted using a pair of candidate BV values, which is updated during the BV prediction process for the CU.

In FIG. 15, BV buffer 0 initially stores a first initial candidate BV value $BV_{init\_0}$ (PBV0), and BV buffer 1 initially stores a second initial candidate BV value $BV_{init\_1}$ (PBV1). The BV value for first PU (PU0) is predicted using either PBV0 or PBV1, as indicated by a flag value for PU0. The BV value for PU0 ($BV_{PU0}$) is processed using the selected BV predictor (e.g., during encoding or decoding).

The pair of candidate BV values is then updated by replacing PBV1 with PBV0, and by replacing PBV0 with the BV value for PU0. That is, PBV1=PBV0, and PBV0=$BV_{PU0}$. In FIG. 15, BV buffer 1 is updated to store $BV_{init\_0}$, and BV buffer 0 is updated to store $BV_{PU0}$. Alternatively, as explained above, the encoder or decoder selectively updates the pair of candidate BV values (and BV buffers) depending on whether the new BV value $BV_{new}$ (here, the $BV_{PU0}$) equals PBV0.

Next, the BV value for the second PU (PU1) is predicted using either PBV0 (in FIG. 15, $BV_{PU0}$ of its neighbor) or PBV1 (in FIG. 15, $BV_{init\_0}$), as indicated by a flag value for PU1. The BV value for PU1 ($BV_{PU1}$) is processed using the selected BV predictor (e.g., during encoding or decoding).

The pair of candidate BV values is then updated by replacing PBV1 with PBV0, and by replacing PBV0 with the BV value for PU1. That is, PBV1=PBV0, and PBV0=$BV_{PU1}$. In FIG. 15, BV buffer 1 is updated to store $BV_{PU0}$, and BV buffer 0 is updated to store $BV_{PU1}$. Alternatively, as explained above, the encoder or decoder selectively updates the pair of candidate BV values (and BV buffers) depending on whether the new BV value $BV_{new}$ (here, the $BV_{PU1}$) equals PBV0.

D. Example BV Prediction Techniques According to Ping-Pong Approaches.

Figure 16:
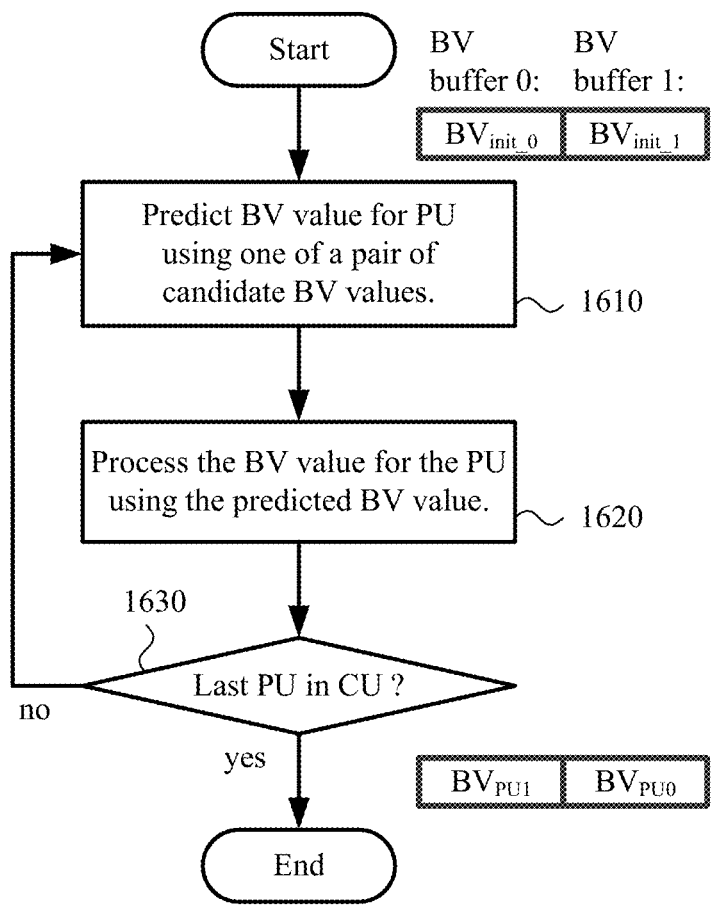
FIG. 16 is a flowchart illustrating an example technique for predicting BV values for a CU with multiple PUs according to example ping-pong approaches.

FIG. 16 shows an example technique for predicting BV values for a CU with multiple PUs according to example ping-pong approaches. The CU is a set of one or more blocks for purposes of encoding and decoding, generally, and each of the PUs is a set of one or more blocks, within the CU, for purposes of signaling of prediction information and/or prediction processing. An image encoder or video encoder such as one described with reference to FIG. 3 or FIGS. 5a-5b, or other encoder, can perform the technique (1600). Or, an image decoder or video decoder such as one described with reference to FIG. 4 or FIG. 6, or other decoder, can perform the technique (1600).

To start, the pair of candidate BV values is a first initial candidate BV value $BV_{init\_0}$ (PBV0) and a second initial candidate BV value $BV_{init\_1}$ (PBV1), which are stored in BV buffers 0 and 1, respectively.

For each of multiple PUs of a current CU of a current picture, the encoder or decoder predicts (1610) a BV value for the PU using one of a pair of candidate BV values. A flag value indicates the selection between the pair of candidate BV values. The pair of candidate BV values can be different for different PUs of the CU. For example, when the current CU includes four PUs, for the first PU, the pair of candidate BV values PBV0 and PBV1 can be $BV_{init\_0}$ and $BV_{init\_1}$, respectively. For the second PU, the pair of candidate BV values PBV0 and PBV1 can be the BV for the first PU ($BV_{PU0}$) and $BV_{init\_0}$, respectively. For the third PU, the pair of candidate BV values PBV0 and PBV1 can be the BV value for the second PU ($BV_{PU1}$) and $BV_{PU0}$, respectively. Finally, for the fourth PU, the pair of candidate BV values can be $BV_{PU1}$ and the BV value for the third PU ($BV_{PU2}$).

The encoder or decoder then processes (1620) the BV value for the PU using the predicted BV value for the PU. For example, during encoding, the encoder determines a BV differential value using the BV value for the PU and the predicted BV value. Or, during decoding, the decoder reconstructs the BV value for the PU based at least in part on the predicted BV value.

The BV buffers can be updated automatically or selectively (depending on whether a new BV value $BV_{new}$ equals PBV0). For example, (as shown in FIG. 14), when the current CU includes four PUs, before the BV prediction for the first PU (PU0), BV buffer 0 stores $BV_{init\_0}$, and BV buffer 1 stores $BV_{init\_1}$. Before the BV prediction for the second PU (PU1), BV buffer 0 stores $BV_{PU0}$, and BV buffer 1 stores $BV_{init\_1}$. Before the BV prediction for the third PU (PU2), BV buffer 0 stores $BV_{PU1}$, and BV buffer 1 stores $BV_{PU0}$. After the processing for PU2, BV buffer 0 retains $BV_{PU1}$, and BV buffer 1 retains $BV_{PU0}$.

After BV prediction for the current CU, when updates to the BV buffers have occurred, the pair of candidate BV values is $BV_{PU1}$ and $BV_{PU0}$ of the current CU. These will be the initial candidate BV values for BV prediction for a subsequent CU of the current picture. Thus, when the current CU includes four PUs, the final pair of candidate BV values can include the BV values for the first and second PUs of the current CU, even though the BV values for the first and second PUs of the current CU were processed before the BV values for the third and fourth PUs of the current CU.

Figure 17:
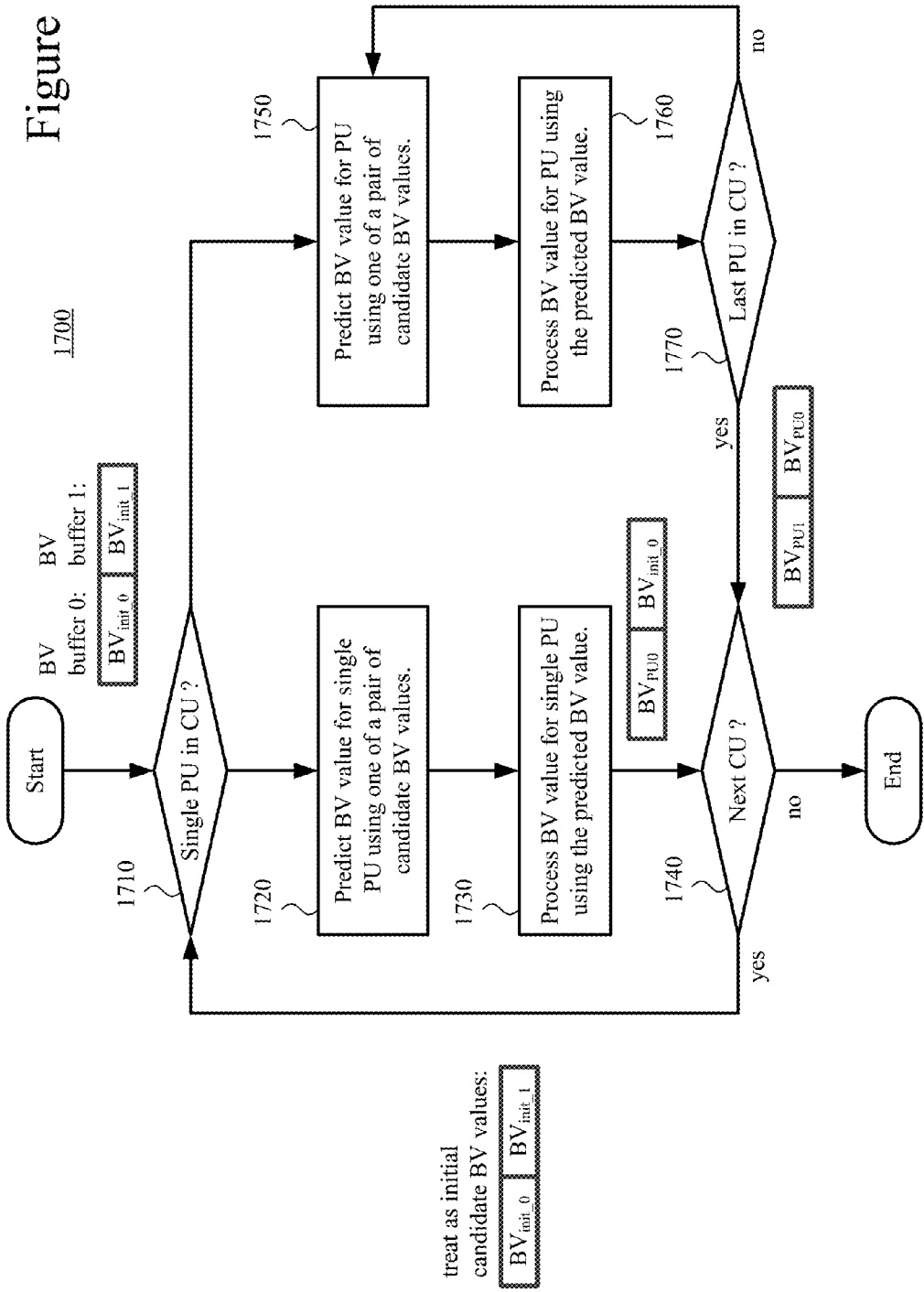
FIG. 17 is a flowchart illustrating an example technique for predicting BV values for CUs according to example ping-pong approaches.

FIG. 17 shows another example technique for predicting BV values for CUs according to example ping-pong approaches, with selective updating of BV buffers. An image encoder or video encoder such as one described with reference to FIG. 3 or FIGS. 5a-5b, or other encoder, can perform the technique (1700). Or, an image decoder or video decoder such as one described with reference to FIG. 4 or FIG. 6, or other decoder, can perform the technique (1700).

The encoder or decoder processes multiple CUs of a current picture. For example, the encoder processes the multiple CUs as part of encoding and outputs encoded data as part of a bitstream. Or, the decoder processes the multiple CUs as part of decoding and outputs reconstructed sample values. Any given CU of the multiple CUs can include a single PU or multiple PUs.

To start, the pair of candidate BV values is a first initial candidate BV value $BV_{init\_0}$ (PBV0) and a second initial candidate BV value $BV_{init\_1}$ (PBV1), which are stored in BV buffers 0 and 1, respectively.

For a given CU of the multiple CUs, the encoder or decoder checks (1710) whether the given CU has a single PU or multiple PUs. If the given CU has a single PU, the encoder or decoder predicts (1720) a BV value for the single PU using one of a pair of candidate BV values PBV0 and PBV1 (in FIG. 17, $BV_{init\_0}$ and $BV_{init\_1}$), where a flag value indicates the selection between the pair of candidate BV values. The encoder or decoder processes (1730) the BV value for the single PU using the predicted BV value. The encoder or decoder selectively updates BV buffers 0 and 1 depending on whether the BV value for the PU ($BV_{PU0}$) equals the BV value stored in BV buffer 0 ($BV_{init\_0}$). For example, the encoder or decoder compares $BV_{PU0}$ and the BV value stored in BV buffer 0 ($BV_{init\_0}$). If $BV_{PU0}$ is different than the BV value stored in BV buffer 0 ($BV_{init\_0}$), the encoder or decoder stores the BV value from BV buffer 0 ($BV_{init\_0}$) in BV buffer 1, and stores $BV_{PU0}$ in BV buffer 0.

After the processing (1730), when updates to the BV buffers have occurred, BV buffer 0 stores the BV value for the single PU ($BV_{PU0}$), and BV buffer 1 stores $BV_{init\_0}$. The encoder or decoder checks (1740) whether to continue with the next CU of the picture. If so, the pair of buffered BV values is treated as the initial candidate BV values $BV_{init\_0}$ and $BV_{init\_1}$ for the next CU.

Otherwise, when the given CU has multiple PUs, the encoder or decoder performs BV prediction and processing for the PUs of the given CU. For each of the multiple PUs of the given CU, the encoder or decoder predicts (1750) a BV value for the PU using one of a pair of candidate BV values PBV0 and PBV1 (initially $BV_{init\_0}$ and $BV_{init\_1}$, but later updated). A flag value for the PU indicates the selection between the pair of candidate BV values. The encoder or decoder processes (1760) the BV value for the PU using the predicted BV value. If the PU is the first or second PU of the given CU, the encoder or decoder selectively updates BV buffers 0 and 1 depending on whether the BV value for the PU ($BV_{PUx}$) equals the BV value stored in BV buffer 0 (PBV0). For example, the encoder or decoder compares $BV_{PUx}$ and PBV0. If $BV_{PUx}$ is different than PBV0, the encoder or decoder stores PBV0 in BV buffer 1, and stores $BV_{PUx}$ in BV buffer 0.

The encoder or decoder checks (1770) whether the PU is the last PU in the given CU. If not, the encoder or decoder continues with BV prediction (1750) for the next PU of the given CU. For example, the PUs are four N×N blocks, two N×2N blocks or two 2N×N blocks of a 2N×2N CU.

After the processing (1760) for the last PU of the given CU, when both updates to the BV buffers have occurred, BV buffer 0 stores the BV value for the second PU ($BV_{PU1}$) of the given CU, and BV buffer 1 stores the BV value for the first PU ($BV_{PU0}$) of the given CU. The encoder or decoder checks (1740) whether to continue with the next CU of the picture. If so, the pair of buffered BV values $BV_{PU1}$ and $BV_{PU0}$ is treated as the initial candidate BV values $BV_{init\_0}$ and $BV_{init\_1}$ for the next CU.

IX. Encoder-Side Options for Intra Block Copy Prediction Mode.

This section presents various innovations for encoder-side options for intra block copy ("BC") prediction. Some of the innovations relate to concurrently performing block vector ("BV") estimation and making block splitting decisions for a block. Other innovations relate to selectively merging blocks into a larger block during BV estimation. Still other innovations relate to estimation of sample values within an overlap area of a current block during BV estimation. In general, these innovations improve coding efficiency of intra BC prediction.

As part of BV estimation, the encoder can use any of several approaches. The encoder can use a full search, evaluating every candidate BV value allowed in a search range. Or, the encoder can use a partial search, evaluating only some of the candidate BV values allowed in a search range. For example, the encoder can start a partial search at the predicted BV value for a current block (e.g., predicted based on BV values of one or more neighboring blocks). After evaluating the candidate BV value at the starting position for the partial search, the encoder can evaluate one or more other candidate BV values at increasing distances from the starting position (e.g., according to a spiral search pattern or some other pattern). When evaluating a given candidate BV value, the encoder can compare all sample values in the intra-prediction region and current block. Or, the encoder can evaluate a subset of the sample values (that is, sub-sample which values are evaluated). When comparing sample values between the intra-prediction region and current block to determine a distortion cost, the encoder can compute mean square error, sum of squared differences, sum of absolute differences, or some other measure of distortion. The encoder can also determine a rate cost associated with encoding of the candidate BV value.

During encoding, at various stages, an encoder can use rate-distortion optimization ("RDO") in which the rate cost and distortion cost of various options are evaluated. In general, rate-distortion cost for an option is given by $D+\lambda R$ (or $R+\lambda D$), where R represents the rate cost in terms of bits of encoded data, D represents the distortion cost using a metric such as mean squared error or a perceptual distortion measure, and $\lambda$ is a Lagrangian multiplier (example of weighting parameter) that weights the rate cost R compared to the distortion cost D. The encoder typically selects the option that gives the lowest rate-distortion cost.

A. Selectively Merging Blocks into Larger Block During BV Estimation.

During BV estimation, an encoder can merge blocks into a larger block. In this way, the encoder can reduce the number of bits used to signal BV information. In particular, when intra BC prediction is performed on a TB-by-TB basis, the encoder can perform BV estimation on a CB-by-CB basis then merge small CBs into a larger CB, relying on splitting of the CB into smaller TBs during intra BC prediction to avoid overlap between a TB and its intra-prediction region.

FIG. 18 shows a technique (1800) for selectively merging blocks into a larger block during BV estimation. The technique (1800) can be performed by an encoder such as one described with reference to FIG. 3 or FIGS. 5a and 5b, or by another encoder.

According to the technique, when the encoder encodes data for a picture using intra BC prediction, for each of multiple blocks with a first size, the encoder identifies (1810) a BV value using BV estimation. The first size can be 8×8, 16×16, 32×32 or some other size. In general, for each of the blocks with the first size, the BV estimation includes determining a cost for a candidate BV value. The cost can include a rate cost and/or a distortion cost. The identified BV value references an intra-prediction region that does not overlap the block with the first size.

The encoder selectively merges (1820) two or more of the blocks into a block with a second size larger than the first size. The second size can be 16×16, 32×32, 64×64 or some other size. For example, the encoder compares the BV values of two or more adjacent blocks among the multiple blocks with the first size and, if the compared BV values are identical, merges the two or more adjacent blocks into the block with the second size. The block with the second size is assigned the identical BV value. Unlike the blocks with the first size, the BV value can reference an intra-prediction region that overlaps the block with the second size.

The encoder can repeat the technique (1800) for another block. Eventually, the encoder outputs the encoded data for the picture.

In some example implementations, each of the multiple blocks with the first size is a CB, and the block with the second size is also a CB. Intra BC prediction, however, is performed on a TB-by-TB basis. The BV estimation can use a full search of a search range for each of the multiple blocks with the first size. Or, the BV estimation can use a partial search of a search range for each of the multiple blocks with the first size, for example, starting at a predicted BV value for the block, and potentially terminating the partial search based at least in part on the cost for a candidate BV value that has been evaluated.

FIG. 19 illustrates an advantage of selective merging (1900) of blocks into a larger block during BV estimation. In FIG. 19, four blocks numbered 0, 1, 2 and 3 (indicated with light solid lines) have BV values that reference corresponding intra-prediction regions 0', 1', 2' and 3', respectively. That is, the BV value references intra-prediction region 0' for block 0, references intra-prediction region 1' for block 1, and so on. The intra-prediction regions are indicated with dotted lines. None of the blocks 0, 1, 2 or 3 overlaps its corresponding intra-prediction region. The larger block that includes blocks 0, 1, 2 and 3 (indicated with a heavy solid line) does overlap its corresponding intra-prediction region, however. If the encoder were to perform BV estimation for the larger block, when overlap between intra-prediction region and block is prohibited, the encoder would not be able to identify the BV value shown in FIG. 19 as an allowable BV value. In contrast, when the encoder performs BV estimation for the smaller blocks 0, 1, 2 and 3, the encoder identifies the same BV value for all four blocks, and the encoder can merge the four blocks into the larger block with the same BV value. During encoding or decoding, the larger block will be split into smaller blocks for the actual intra BC prediction operations. For example, a CB having a given size is split into smaller TBs for performance of the intra BC prediction operations on a TB-by-TB basis, with no overlap between a TB and its intra-prediction region.

B. Concurrent Block Vector Estimation and Block Splitting Decisions.

The encoder can perform BV estimation and block splitting decisions concurrently for a current block. In particular, when intra BC prediction operations are performed on a TB-by-TB basis, the encoder can concurrently evaluate a candidate BV value and possible block splitting decisions for a current block.

FIG. 20 is a flowchart illustrating a generalized technique for concurrently performing BV estimation and making block splitting decisions for a block. The technique (2000) can be performed by an encoder such as one described with reference to FIG. 3 or FIGS. 5a and 5b, or by another encoder.

When the encoder encodes data for a picture using intra BC prediction, the encoder encodes (2010) data for a current block. As part of the encoding (2010), the encoder performs BV estimation operations and block splitting decision operations concurrently. In some example implementations, the current block is a CB corresponding in size to a TB, and intra BC prediction is performed on a TB-by-TB basis. For example, as part of the encoding (2010), the encoder performs the technique (2100) shown in FIG. 21 to concurrently evaluate a candidate BV value and possible block splitting decisions for the current block.

Figure 21:
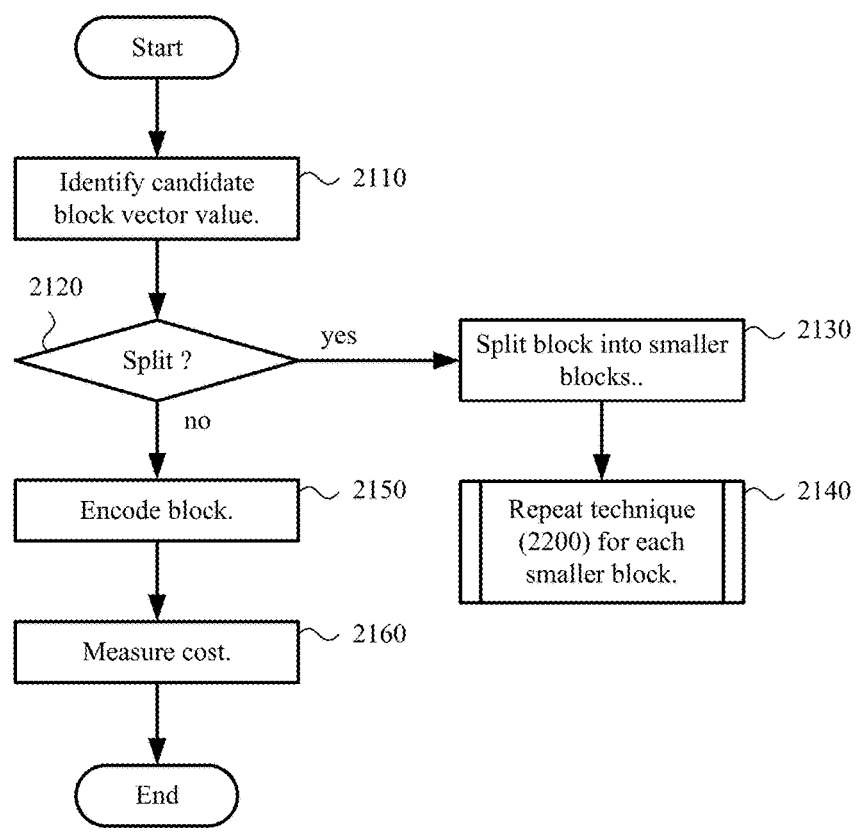
FIG. 21 is a flowchart illustrating an example technique for concurrently evaluating a candidate BV value and block splitting decisions for a block.

FIG. 21 is flowchart illustrating an example technique for concurrently evaluating a candidate BV value and block splitting decisions for a block. The technique (2100) can be performed by an encoder such as one described with reference to FIG. 3 or FIGS. 5a and 5b, or by another encoder.

The encoder identifies (2110) a candidate BV value for the current block using BV estimation operations. The current block has a first size. For example, the first size is 8×8, 16×16, 32×32, 64×64 or some other size.

The encoder checks (2120) whether to split the current block. For example, the encoder evaluates whether intra BC prediction with the candidate BV value for the current block results in overlap between the current block and an intra-prediction region referenced by the candidate BV value.

Depending on the results of the check (2120), the encoder selectively splits (2130) the current block into multiple blocks each having a second size smaller than the first size. For example, the second size is 4×4, 8×8, 16×16, 32×32, or some other size. Then (the current block having been split), the encoder repeats (2140) the technique (2100) for each of the smaller blocks. That is, for each of the blocks having the second size, the encoder repeats the identifying, the evaluating, the selectively splitting, etc., with the block having the second size being treated as the current block.

On the other hand, if the current block is not split, the encoder encodes (2150) the current block and measures (2160) the cost of encoding the current block. For example, when it encodes the current block, the encoder (a) predicts sample values of the current block using intra BC prediction, (b) determines residual values for the current block using the predicted sample values and the sample values of the current block, (c) optionally applies a frequency transform to the residual values to produce transform coefficients and quantizes the transform coefficients, (d) optionally inverse quantizes the transform coefficients and applies an inverse frequency transform to reconstruct the residual values, and (e) combines the residual values and the predicted sample values. The measured cost can be a rate-distortion cost, rate cost or distortion cost. The rate cost can account for both cost of signaling the BV value and cost of signaling block splitting decision information.

Alternatively, the encoder evaluates a candidate BV value and possible block splitting decisions for the current block in some other way. For example, in addition to considering overlap between an intra-prediction region and block, the encoder also considers whether the block already has the smallest allowable size. If so, the block is not split, but the candidate BV value is disallowed.

Returning to FIG. 20, as part of the encoding (2010), the encoder can record the cost for the candidate BV value. The encoder can then evaluate one or more other candidate BV values. For example, the encoder repeats the technique (2100) for another candidate BV value. Eventually, the encoder selects one or more BVs and makes block splitting decisions for the current block (and blocks within the current block) that result in lowest cost (e.g., rate-distortion cost, rate cost or distortion cost).

The encoder outputs (2020) the encoded data for the block. The encoder can repeat the technique (2000) for another block.

C. Estimating Reconstructed Sample Values within an Overlap Area.

In some examples described herein, BVs are signaled at the level of CUs and applied to blocks at the CB level. Overlap between a CB and corresponding intra-prediction region is not allowed. In other examples described herein, an encoder applies a BV value to smaller blocks on a TB-by-TB basis, even though the BV value is signaled at a higher syntax level (e.g., for a CU). For example, a BV value is signaled for a CU with a 32×32 CB, but the BV value is applied to blocks at the level of 4×4 TBs or 8×8 TBs. This permits the BV value to have a smaller magnitude, while still not having overlap between the block at TB level and intra-prediction region that is copied.

When a given block is split into smaller blocks for purposes of intra BC prediction operations, the given block includes an overlap area in which sample values of the given block may be part of intra-prediction regions for one or more of the smaller blocks. This section describes approaches to estimating reconstructed sample values within the overlap area. In particular, this section describes approaches to estimating reconstructed sample values within an overlap area of a block when a BV value for the block is applied to smaller blocks on a TB-by-TB basis.

Figure 22A:
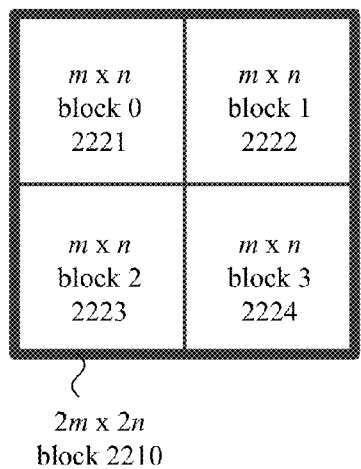
FIGS. 22a and 22b are diagrams illustrating an overlap area of a current block during BV estimation.

FIG. 22a illustrates a current block (2210) having size 2m×2n. The current block (2210) includes four m×n blocks (2221, 2222, 2223, 2224) for purposes of intra BC operations. For example, the current block (2210) is an 8×8 block of a CU, and the four smaller blocks (2221, 2222, 2223, 2224) are 4×4 blocks with 4×4 TBs. Or, the current block (2210) is a 16×16 block of a CU, and the four smaller blocks (2221, 2222, 2223, 2224) are 8×8 blocks with 8×8 TBs. When intra BC prediction operations are applied to the m×n blocks in zigzag scan order (in FIG. 22a, block 0, block 1, block 2, then block 3), the intra-prediction region for the first m×n block (2221) is outside the current 2m×2n block (2210). For the second m×n block (2222), however, the intra-prediction region may overlap the first m×n block (2221) in part or completely. For the third m×n block (2223), the intra-prediction region may overlap the first m×n block (2221) or the second m×n block (2222) in part or completely. And for the fourth m×n block (2224), the intra-prediction region may overlap any of the first three m×n block (2221, 2222, 2223) of the current block (2210) in part or completely.

Figure 22B:
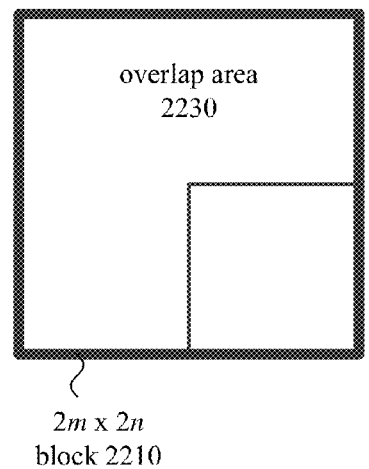

FIG. 22b shows the overlap area (2230) of the current block (2210). The overlap area (2230) covers the first three m×n blocks (2221, 2222, 2223) in zigzag scan order, since sample values in these three m×n blocks might be part of an intra-prediction region for at least one m×n block of the current block (2210). For another size of smaller block (e.g., 4×4 blocks of a 16×16 block or 32×32 block), the overlap area could cover even more of the current block.

During BV estimation, when an encoder evaluates a candidate BV value for a current block that is split into smaller blocks for purposes of intra BC prediction operations, the encoder can calculate actual reconstructed sample values within the overlap area as the encoder applies the candidate BV value across the respective smaller blocks in zigzag order. This can be computationally intensive, since it involves encoding operations and reconstruction operations applied per candidate BV value per smaller block. Instead, the encoder can estimate reconstructed sample values within the overlap area. In particular, when intra BC prediction operations are performed for smaller blocks on a TB-by-TB basis, the encoder can estimate reconstructed sample values within the overlap area of a current block that includes the multiple smaller blocks.

Figure 23:
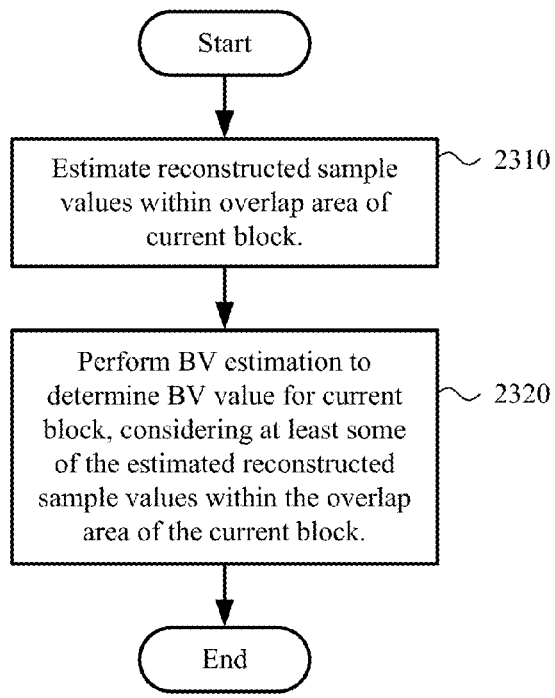
FIG. 23 is a flowchart illustrating an example technique for BV estimation in which an encoder estimates reconstructed sample values within an overlap area.

FIG. 23 is flowchart illustrating an example technique for BV estimation in which an encoder estimates reconstructed sample values within the overlap area. The technique (2300) can be performed by an encoder such as one described with reference to FIG. 3 or FIGS. 5a and 5b, or by another encoder.

For a current block of a picture, the encoder estimates (2310) reconstructed sample values within an overlap area of the current block. The current block has multiple smaller blocks. For example, the current block has a first size (e.g., 32×32, 16×16 or 8×8), and each of the multiple blocks has a second size smaller than the first size (e.g., 16×16, 8×8 or 4×4). The current block can be a block of a CU, in which case each of the multiple smaller blocks can be at the level of a TB of a TU. The overlap area covers parts of the current block that are in potential intra-prediction regions for at least one of the multiple smaller blocks.

According to a first approach to estimating reconstructed sample values within the overlap area, the encoder uses corresponding original sample values as the reconstructed sample values, respectively, within the overlap area. Outside the current block, the BV estimation can use original sample values within the picture. Alternatively, outside the current block, the BV estimation can use reconstructed sample values within the picture (that is, reconstructed sample values outside the current block; original sample values within the overlap area of the current block). In this case, original sample values may be used in the intra-prediction region when no actual reconstructed sample values are available during BV estimation, but otherwise actual reconstructed sample values are used.

According to a second approach to estimating reconstructed sample values within the overlap area, the encoder processes the original sample values within the overlap area. In particular, the encoder applies a frequency transform, quantization, inverse quantization and an inverse frequency transform to the original sample values within the overlap area, yielding an approximation of the reconstructed sample values within the overlap area. The quantization and inverse quantization can use a quantization parameter that has been applied (or is expected to be applied) in a neighborhood around the current block.

According to a third approach to estimating reconstructed sample values within the overlap area, the encoder uses intra BC prediction operations when estimating the reconstructed sample values within the overlap area. The encoder predicts sample values within the overlap area using at least one BV predictor (such as a BV value for a previous block in the picture, e.g., a neighbor block, or a default BV predictor). The encoder determines residual values based on differences between the predicted sample values and corresponding original sample values within the overlap area. To the residual values, the encoder applies a frequency transform, quantization, inverse quantization and an inverse frequency transform. The quantization and inverse quantization can use a quantization parameter that has been applied (or is expected to be applied) in a neighborhood around the current block. The encoder combines the results of the processing (that is, the reconstructed residual values) with the predicted sample values, which yields an approximation of the reconstructed sample values within the overlap area.

In one variation of the third approach, the encoder predicts sample values within the overlap area using at least one BV predictor (such as a BV value for a previous block in the picture, e.g., a neighbor block, or a default BV predictor), but skips the processing of the residual values. The estimated reconstructed sample values in the overlap area are the predicted sample values.

In another variation of the third approach, the encoder can estimate whether the residual values for the overlap area will be significant (e.g., have non-zero transform coefficient values after transform, quantization, etc.). For example, the encoder can evaluate whether the residual values have small magnitude, individually or collectively, or check some other condition for the residual values. If the residual values are not significant, the encoder can skip the residual processing and simply use the predicted sample values as the estimated reconstructed sample values in the overlap area. Otherwise (residual values are significant), the encoder can encode then reconstruct the residual values, then combine them with the predicted sample values to produce the estimated reconstructed sample values in the overlap area, as described above.

The encoder performs (2320) BV estimation to determine a BV value for the current block. The BV estimation uses at least some of the estimated reconstructed sample values within the overlap area of the current block. The BV estimation also uses reconstructed sample values (or original sample values, in one approach) within the picture outside the current block.

The BV estimation can include, for each of one or more candidate BV values for the current block, performing block matching operations between the smaller blocks, respectively, and candidate intra-prediction regions according to the candidate BV value. For example, for a given candidate BV value for a current block with four smaller blocks, the encoder performs block matching operations between the four smaller blocks and their corresponding candidate intra-prediction regions according to the given candidate BV value.

Alternatively, the BV estimation can include (1) for each of the multiple smaller blocks, determining a BV value for the smaller block, and then (2) synthesizing the BV values for the multiple smaller blocks into the BV value for the current block. For example, for a current block with four smaller blocks, the encoder determines, in succession, a BV value for the first smaller block, a BV value for the second smaller block, a BV value for the third smaller block and a BV value for the fourth smaller block. After the first smaller block, the BV estimation may include evaluation of intra-prediction regions in the overlap area of the current block. The encoder then synthesizes the BV values for the four smaller blocks into the BV value for the current block. For example, the encoder can (a) average the BV values for the multiple smaller blocks, (b) calculate a median of the BV values for the multiple smaller blocks, (c) identify the BV value for the current block in a neighborhood around the BV values for the multiple smaller blocks, (d) identify the BV value for the current block using RDO for candidate BV values in a neighborhood around the BV values for the multiple smaller blocks, or (e) synthesize the BV values for the multiple smaller blocks into the BV value for the current block in some other way.

After the BV value for the current block has been identified by BV estimation, the encoder can perform intra BC prediction for the current block using the BV value for the current block. In doing so, the encoder performs BC operations on a block-by-block basis for the multiple smaller blocks. Thus, the encoder can perform BV estimation at the level of the current block but perform BV compensation at the level of the smaller blocks. For example, the encoder can perform BV estimation for an 8×8 block of an 8×8 CU, but perform intra BC operations (and reconstruction operations) on a TB-by-TB basis for four 4×4 blocks in zigzag scan order. The 4×4 blocks share the same BV value (of the 8×8 CU), and the encoder performs 4×4 transforms, quantization, inverse quantization, 4×4 inverse transforms, etc. to successive 4×4 blocks of residual values. The first 4×4 block (for TB 0) is reconstructed, then may be used in an intra-prediction region for the second 4×4 block (for TB 1). The second 4×4 block is reconstructed, then may be used in an intra-prediction region for the third 4×4 block (for TB 2).

For the fourth 4×4 block (for TB 3), any of the first three 4×4 blocks may be used in an intra-prediction region.

At the decoder side, as described above, the decoder can check whether a BV value results in overlap between an intra-prediction region and current block. If so, the block (at TB level) is split into four smaller blocks (at the level of a smaller TB), then the four smaller blocks are successively decoded (using intra BC prediction and reconstruction operations) in zigzag order. Thus, the reconstructed sample values for one of the smaller blocks are available for use in the intra-prediction region for the next smaller block in zigzag order. If the transform block flag of a TU is zero, intra BC prediction is applied only at the CU level, and chroma de-correlation is disabled.

D. Alternatives and Variations.

Many of the preceding examples address BV values and intra BC prediction operations for luma blocks. For video in YUV 4:4:4 format, chroma components have the same resolution as a luma component. The BV value used for a current luma block can be used for corresponding chroma blocks. When the current luma block is split into smaller luma blocks for intra BC prediction operations, the corresponding chroma blocks are also split into smaller chroma blocks in the same manner for intra BC prediction operations.

For video in YUV 4:2:0 format, chroma components are downsampled by a factor of two horizontally and by a factor of two vertically. For example, if the current luma block has size of 16×16, the corresponding chroma blocks have size of 8×8. The BV value used for a current luma block can be used for corresponding chroma blocks, after appropriate scaling and rounding (and/or truncation) operations. In general, when the current luma block is split into smaller luma blocks for intra BC prediction operations, the corresponding chroma blocks are also split into smaller chroma blocks in the same manner for intra BC prediction operations.

In some implementations, however, this is not always the case. In some implementations, if a luma TB of video in YUV 4:2:0 format has the minimum transform size, chroma TBs having that minimum transform size are used for the chroma counterparts for that luma TB and its three neighboring luma TBs for the same CB. For example, if the current luma TB has minimum size of 4×4 (and is associated with an 8×8 luma CB), corresponding chroma CBs have the size of 4×4. Each 4×4 chroma CB has a single 4×4 chroma TB. Chroma TBs with size 2×2, as might be expected with downsampling for the YUV 4:2:0 format, are not supported. In such implementations, splitting of the current luma block into smaller luma blocks for intra BC prediction operations is not supported if the smaller luma blocks would have the minimum transform size because, when applied to the corresponding chroma blocks, the splitting would result in chroma blocks smaller than the minimum transform size. In such implementations, splitting of the current luma block (and corresponding chroma blocks) into smaller blocks for intra BC prediction operations is still permitted for larger sizes.

For video in YUV 4:2:2 format, chroma components are downsampled by a factor of two horizontally. For example, if the current luma block has size of 16×16, the corresponding chroma blocks have size of 8×16. The BV value used for a current luma block can be used for corresponding chroma blocks, after appropriate scaling and rounding (and/or truncation) operations. In general, when the current luma block is split into smaller luma blocks for intra BC prediction operations, the corresponding chroma blocks can also be split into smaller chroma blocks in the same manner for intra BC prediction operations.

In some implementations, however, this is not always the case. In some implementations, if a luma TB of video in YUV 4:2:2 format has minimum transform size, chroma TBs having that minimum transform size are used for the chroma counterparts for that luma TB and a neighboring luma TB in the same CB. For example, if the current luma TB has minimum size of 4×4 (and is associated with an 8×8 CB), corresponding 4×8 chroma CBs each have two 4×4 chroma TBs. Chroma TBs with size 2×4, as might be expected with downsampling for the YUV 4:2:2 format, are not supported. Instead, each of the 4×4 chroma TBs of a 4×8 chroma CB includes residual values for two 2×4 chroma areas. In such implementations, splitting of the current luma block into smaller luma blocks for intra BC prediction operations as described above (with corresponding splitting of chroma blocks into smaller chroma blocks for intra BC prediction operations, as described above) is permitted for block sizes larger than the minimum transform size. If the smaller blocks have the minimum transform size, splitting of the current luma block into smaller luma blocks for intra BC prediction operations is supported if chroma blocks of residual values are rearranged as shown in FIG. 24.

Figure 24:
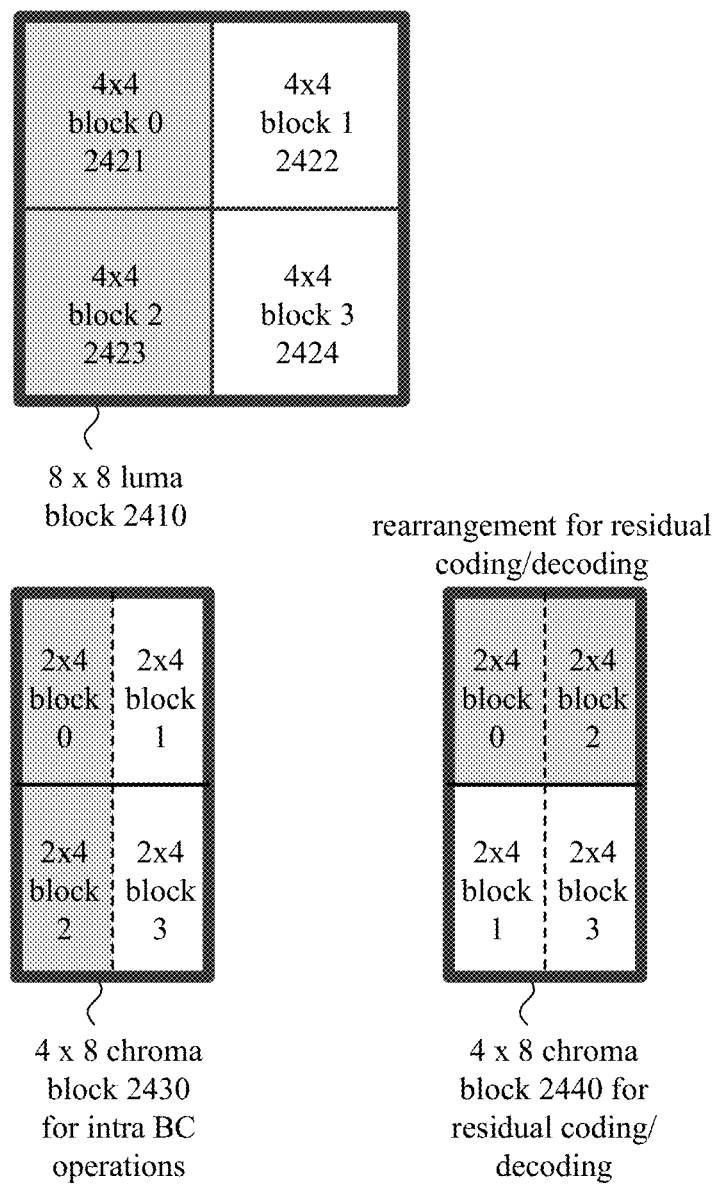
FIG. 24 is a diagram illustrating an overlap area of blocks with minimum transform size for video in YUV 4:2:2 format during BV estimation.

FIG. 24 shows blocks with minimum transform size of 4×4 for video in YUV 4:2:2 format. An 8×8 luma block (2410) includes four 4×4 luma blocks (2421, 2422, 2423, 2424), which are numbered 0 . . . 3. A corresponding 4×8 chroma block (2430) includes corresponding chroma components, which are downsampled by a factor of two horizontally. The transform size of 2×4 is not supported.

According to the current draft of the HEVC standard, for a 4×8 chroma block, 2×4 blocks 0 and 1 are processed together as a 4×4 chroma TB with 4×4 transform size for residual coding and decoding, and 2×4 blocks 2 and 3 are processed together as a 4×4 chroma TB with 4×4 transform size for residual coding and decoding. As a result, since 2×4 block 0 will not be reconstructed until 2×4 block 1 is reconstructed, intra BC prediction operations for 2×4 block 1 cannot reference reconstructed sample values in 2×4 block 0. Similarly, intra BC prediction operations for 2×4 block 3 cannot reference reconstructed sample values in 2×4 block 2.

As shown in FIG. 24, the 2×4 blocks of the 4×8 chroma block (2440) can be rearranged for purposes of residual coding and decoding. In this case, 2×4 blocks 0 and 2 are processed together as a 4×4 chroma TB with 4×4 transform size for residual coding and decoding, and 2×4 blocks 1 and 3 are processed together as a 4×4 chroma TB with 4×4 transform size for residual coding and decoding. Intra BC prediction operations still happen in the "un-rearranged" 2×4 blocks of the 4×8 chroma block (2430). When the 4×8 chroma block is decoded, intra BC prediction for 2×4 blocks 0 and 2 can happen first, followed by residual decoding for 2×4 blocks 0 and 2 and reconstruction of sample values for 2×4 blocks 0 and 2. Then, 2×4 blocks 1 and 3 are reconstructed. Thus, 2×4 block 0 can be reconstructed before 2×4 block 1 is reconstructed, so intra BC prediction operations for 2×4 block 1 can reference reconstructed sample values in 2×4 block 0. Similarly, intra BC prediction operations for 2×4 block 3 can reference reconstructed sample values in 2×4 block 2. This rearrangement of 2×4 chroma blocks of residual values happens at the encoder and at the decoder.

With the 4×8 chroma block (2440) having rearranged 2×4 blocks for residual coding and decoding, an overlap area is supported for the left half of the luma block and corresponding chroma blocks, as shown in gray. During BV estimation, an encoder can estimate reconstructed sample values in the overlap area (as described above) and evaluate candidate BV values that reference intra-prediction regions that partially or completely cover the overlap area.

In this approach, BV values with non-zero horizontal BV components are allowed, but the BV values have zero-value vertical BV components. This is appropriate for screen capture content, for example, which typically exhibits horizontal continuity in sample values.

In example implementations, intra BC prediction uses BV values with integer-sample precision for luma blocks and for chroma blocks. Fractional displacements (and fractional interpolation between reconstructed sample values) are not used for BV values. When chroma data for a picture has reduced resolution relative to the luma data for the picture (e.g., when the format is YUV 4:2:0 format or YUV 4:2:2 format), the BV value from the luma block, before it is applied to a corresponding chroma block, may be scaled down to adjust for the difference in chroma resolution, but is rounded and/or truncated to a value with integer-sample precision.

Alternatively, BV values have integer-sample precision for luma blocks but may have fractional-sample precision for corresponding chroma blocks. In particular, when chroma data for a picture has reduced resolution relative to the luma data for the picture, the BV value from the luma block, before it is applied to a corresponding chroma block, may be scaled down to adjust for the difference in chroma resolution. For YUV 4:2:0 format, the vertical and horizontal components of a BV value can be divided by two, and truncated or rounded, yielding a value with either integer-sample precision or a fractional-sample precision such as half-sample precision. For example, a BVy component value of 3 for a luma block is scaled to a BVy component value of 1.5 for a corresponding chroma block. For YUV 4:2:2 format, the horizontal component of a BV value can be divided by two, and truncated or rounded, yielding a value with either integer-precision or a fractional-sample precision such as half-sample position precision. When a BV value has fractional-sample precision, interpolation between reconstructed sample values can use bilinear interpolation, bicubic interpolation or another form of interpolation.

Alternatively, BV values can have fractional-sample prediction for luma blocks and corresponding chroma blocks. Again, when a BV value has fractional-sample precision, interpolation between reconstructed sample values can use bilinear interpolation, bicubic interpolation or another form of interpolation.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computing device comprising:
    an encoder configured to perform operations to produce encoded data for a picture, wherein the encoder is a video encoder or image encoder, and wherein the operations include:
        estimating reconstructed sample values within an overlap area of a current block of the picture, wherein the current block has multiple smaller blocks, the overlap area covering parts of the current block that are in potential intra-prediction regions for at least one of the multiple smaller blocks, wherein the estimating the reconstructed sample values within the overlap area includes using corresponding original sample values from within the overlap area to determine the estimated reconstructed sample values, respectively, within the overlap area without using reconstructed sample values from outside the overlap area as the estimated reconstructed sample values, respectively, within the overlap area; and
        performing block vector ("By") estimation to determine a BV value for the current block, the BV value indicating a displacement from the current block to a region of the picture that includes sample values used for prediction, and wherein the BV estimation uses at least some of the estimated reconstructed sample values within the overlap area of the current block; and
    a buffer configured to store the encoded data for output as part of a bitstream.

2. The computing device of claim 1 wherein the corresponding original sample values from within the overlap area are used as the estimated reconstructed sample values, respectively, within the overlap area.

3. The computing device of claim 1 wherein the using the corresponding original sample values from within the overlap area to determine the estimated reconstructed sample values, respectively, within the overlap area includes:
    processing the corresponding original sample values from within the overlap area using a frequency transform, quantization, inverse quantization and an inverse frequency transform; and
    using the processed sample values as the estimated reconstructed sample values, respectively, within the overlap area.

4. The computing device of claim 1 wherein:
    the using the corresponding original sample values from within the overlap area to determine the estimated reconstructed sample values, respectively, within the overlap area includes:
        predicting sample values within the overlap area using at least one BV predictor;
        determining residual values based on differences between the predicted sample values and the corresponding original sample values from the overlap area;
        processing the residual values using a frequency transform, quantization, inverse quantization and an inverse frequency transform; and
        combining results of the processing with the predicted sample values; and
    results of the combining are used as the estimated reconstructed sample values, respectively, within the overlap area.

5. The computing device of claim 1 wherein the BV estimation includes, for each of one or more candidate BV values for the current block:
    performing block matching operations between the multiple smaller blocks, respectively, and candidate intra-prediction regions according to the candidate BV value.

6. The computing device of claim 1 wherein the BV estimation includes:
    for each of the multiple smaller blocks, determining a BV value for the smaller block; and
    synthesizing the BV values for the multiple smaller blocks into the BV value for the current block.

7. The computing device of claim 1 wherein the operations further comprise:
performing intra block copy ("BC") prediction for the current block using the BV value for the current block, including performing BC operations on a block-by-block basis for the multiple smaller blocks.

8. The computing device of claim 1 wherein the current block is a coding block of a coding unit, and wherein each of the multiple blocks is a transform block of a transform unit.

9. In a computing device that implements a video encoder or image encoder, a method comprising:
encoding a picture to produce encoded data, wherein the encoding includes:
estimating reconstructed sample values within an overlap area of a current block of the picture, wherein the current block has multiple smaller blocks, the overlap area covering parts of the current block that are in potential intra-prediction regions for at least one of the multiple smaller blocks, wherein the estimating the reconstructed sample values within the overlap area includes:
determining estimated values for the reconstructed sample values, respectively, within the overlap area using corresponding original sample values from within the overlap area; and
using the estimated values as the reconstructed sample values, respectively, within the overlap area without using reconstructed sample values from outside the overlap area as the reconstructed sample values, respectively, within the overlap area; and
performing block vector ("By") estimation to determine a BV value for the current block, the BV value indicating a displacement from the current block to a region of the picture that includes sample values used for prediction, and wherein the BV estimation uses at least some of the estimated reconstructed sample values within the overlap area of the current block; and
outputting the encoded data as part of a bitstream.

10. The method of claim 9 wherein:
the estimated values are the corresponding original sample values from within the overlap area; and
the corresponding original sample values from within the overlap area are used as the reconstructed sample values, respectively, within the overlap area.

11. The method of claim 9 wherein:
the determining the estimated values for the reconstructed sample values within the overlap area includes processing the corresponding original sample values from the overlap area using a frequency transform, quantization, inverse quantization and an inverse frequency transform; and
the processed sample values are used as the reconstructed sample values, respectively, within the overlap area.

12. The method of claim 9 wherein:
the determining the estimated values for the reconstructed sample values respectively, within the overlap area includes:
predicting sample values within the overlap area using at least one BV predictor;
determining residual values based on differences between the predicted sample values and the corresponding original sample values from the overlap area;
processing the residual values using a frequency transform, quantization, inverse quantization and an inverse frequency transform;
combining results of the processing with the predicted sample values; and
results of the combining are used as the reconstructed sample values, respectively, within the overlap area.

13. The method of claim 9 wherein the BV estimation includes, for each of one or more candidate BV values for the current block:
performing block matching operations between the multiple smaller blocks, respectively, and candidate intra-prediction regions according to the candidate BV value.

14. The method of claim 9 wherein the BV estimation includes:
for each of the multiple smaller blocks, determining a BV value for the smaller block; and
synthesizing the BV values for the multiple smaller blocks into the BV value for the current block.

15. The method of claim 9 wherein the encoding further comprises:
performing intra block copy ("BC") prediction for the current block using the BV value for the current block, including performing BC operations on a block-by-block basis for the multiple smaller blocks.

16. The method of claim 9 wherein the current block is a coding block of a coding unit, and wherein each of the multiple blocks is a transform block of a transform unit.

17. One or more computer-readable media storing computer-executable instructions for causing a computing device, when programmed thereby, to perform operations, wherein the one or more computer-readable media are selected from the group consisting of volatile memory, non-volatile memory, magnetic disk, CD-ROM, and DVD, the operations comprising:
encoding a picture to produce encoded data, wherein the encoding includes:
estimating reconstructed sample values within an overlap area of a current block of the picture, wherein the current block has multiple smaller blocks, the overlap area covering parts of the current block that are in potential intra-prediction regions for at least one of the multiple smaller blocks, wherein the estimating the reconstructed sample values within the overlap area includes:
determining estimated values for the reconstructed sample values, respectively, within the overlap area using corresponding original sample values from within the overlap area; and
using the estimated values as the reconstructed sample values, respectively, within the overlap area without using reconstructed sample values from outside the overlap area as the reconstructed sample values, respectively, within the overlap area; and
performing block vector ("By") estimation to determine a BV value for the current block, the BV value indicating a displacement from the current block to a region of the picture that includes sample values used for prediction, and wherein the BV estimation uses at least some of the estimated reconstructed sample values within the overlap area of the current block; and
outputting the encoded data as part of a bitstream.

18. The one or more computer-readable media of claim 17 wherein:

the estimated values are the corresponding original sample values from within the overlap area; and the corresponding original sample values from within the overlap area are used as the reconstructed sample values, respectively, within the overlap area.

19. The one or more computer-readable media of claim 17 wherein:

the determining the estimated values for the reconstructed sample values respectively, within the overlap area includes processing the corresponding original sample values from the overlap area using a frequency transform, quantization, inverse quantization and an inverse frequency transform; and the processed sample values are used as the reconstructed sample values, respectively, within the overlap area.

20. The one or more computer-readable media of claim 17 wherein:

the determining the estimated values for the reconstructed sample values respectively, within the overlap area includes:

predicting sample values within the overlap area using at least one BV predictor;

determining residual values based on differences between the predicted sample values and the corresponding original sample values from the overlap area;

processing the residual values using a frequency transform, quantization, inverse quantization and an inverse frequency transform;

combining results of the processing with the predicted sample values; and results of the combining are used as the reconstructed sample values, respectively, within the overlap area.

* * * * *